(12) United States Patent
Bolle

(10) Patent No.: US 8,774,580 B2
(45) Date of Patent: Jul. 8, 2014

(54) TURNING MIRROR FOR PHOTONIC INTEGRATED CIRCUITS

(75) Inventor: Christian Bolle, Bridgewater, NJ (US)

(73) Assignee: Alcatel Lucent, Paris (FR)

( * ) Notice: Subject to any disclaimer, the term of this patent is extended or adjusted under 35 U.S.C. 154(b) by 643 days.

(21) Appl. No.: 12/629,119

(22) Filed: Dec. 2, 2009

(65) Prior Publication Data

US 2011/0129181 A1    Jun. 2, 2011

(51) Int. Cl.
*G02B 6/12* (2006.01)
*G02B 6/26* (2006.01)
*G02B 6/42* (2006.01)

(52) U.S. Cl.
USPC .................... 385/47; 385/14; 385/25

(58) Field of Classification Search
USPC ............................................. 385/14, 25, 47
See application file for complete search history.

(56) References Cited

U.S. PATENT DOCUMENTS

2004/0042377 A1\* 3/2004 Nikolai et al. ........... 369/112.09
2005/0002605 A1\* 1/2005 Sakai et al. .................... 385/27

OTHER PUBLICATIONS

Bazylenko, M.V., et al.; "Fabrication of Light-Turning Mirrors in Buried-Channel Silica Waveguides for Monolithic and Hybrid Integration"; Journal of Lightwave Technology, vol. 15, No. 1 (IEEE), Jan. 1997; pp. 148-153.
Jones, C.A., et al.; "Hybrid integration onto silicon motherboards with planar silica waveguides"; IEE Proc.—Optoelectron., vol. 143, No. 5, Oct. 1996; pp. 316-321.
Tang, Y.Z., et al.; "Integrated Waveguide Turning Mirror in Silicon-on-Insulator"; IEEE photonics Technology Letters, vol. 14, No. 1, Jan. 2002; pp. 68-70.
Crookes, C.G., et al.; "Selfaligned integrated silica on a silicon waveguide-photodiode interface"; Electronics Letters, Jun. 9, 1994, vol. 30, No. 12; pp. 1002-1003.
Epoxy Technology, "EPO-TEK H20E—Technical Data Sheet"; Epoxy Technology, Inc.—www.EPOTEK.com; 2 Pages.

\* cited by examiner

*Primary Examiner* — Jerry Blevins
(74) *Attorney, Agent, or Firm* — Hitt Gaines, PC

(57) ABSTRACT

An optical device comprising a substrate having a planar surface and an optical waveguide located on and parallel to the planar surface and having an end located and oriented to emit or receive light propagating substantially parallel to the planar surface. The device also comprises a crystalline turning mirror bound to the planar surface, the crystalline turning mirror having a bottom surface along the planar surface and having a reflecting surface that is slanted relative to said planar surface. The crystalline turning mirror and the substrate are formed of different materials.

13 Claims, 21 Drawing Sheets

US 8,774,580 B2

TURNING MIRROR FOR PHOTONIC INTEGRATED CIRCUITS

TECHNICAL FIELD

The present disclosure is directed, in general, to an optical apparatus and more specifically, a photonic integrated circuit, and, methods of using and manufacturing the same.

BACKGROUND

This section introduces aspects that may be helpful to facilitating a better understanding of the inventions. Accordingly, the statements of this section are to be read in this light. The statements of this section are not to be understood as admissions about what is in the prior art or what is not in the prior art.

The compactness and manufacturing cost of photonic integrated circuit (PIC) devices can be hampered by the need to optically couple components that have different heights on a mounting surface.

SUMMARY OF THE INVENTION

To address some of the above-discussed limitations, one embodiment is an optical device. The device comprises a substrate having a planar surface and an optical waveguide located on and parallel to the planar surface and having an end located and oriented to emit or receive light propagating substantially parallel to the planar surface. The device also comprises a crystalline turning mirror bound to the planar surface, the crystalline turning mirror having a bottom surface along the planar surface and having a reflecting surface that is slanted relative to said planar surface. The crystalline turning mirror and the substrate are formed of different materials.

Another embodiment is a method of using an optical device. The method comprises transmitting light to an optical waveguide located on a planar surface of a substrate such that the light propagates substantially parallel to the planar surface. The method comprises emitting the transmitted light from an end of the waveguide, the end located and oriented to emit or receive the light. The method comprises reflecting the emitted light off of a reflecting surface of a crystalline turning mirror bound along a bottom surface thereof to the planar surface, the reflecting surface being slanted relative to the planar surface and oriented to direct the light into or out of the end of the waveguide.

Another embodiment is a method of manufacturing an optical device. The method comprises forming an optical waveguide on a planar surface of a substrate, wherein the waveguide is parallel to the planar surface and an end of the waveguide is located and oriented to emit or receive light propagating substantially parallel to the planar surface. The method also comprises bonding a crystalline turning mirror to the planar surface, the bonded crystalline turning mirror having a reflecting surface that is slanted relative to the planar surface and is facing the end of the waveguide.

BRIEF DESCRIPTION OF THE DRAWINGS

The embodiments of the disclosure are best understood from the following detailed description, when read with the accompanying FIGUREs. Corresponding or like numbers or characters indicate corresponding or like structures. Various features may not be drawn to scale and may be arbitrarily increased or reduced in size for clarity of discussion. Reference is now made to the following descriptions taken in conjunction with the accompanying drawings, in which.

DETAILED DESCRIPTION

Figure 1A:
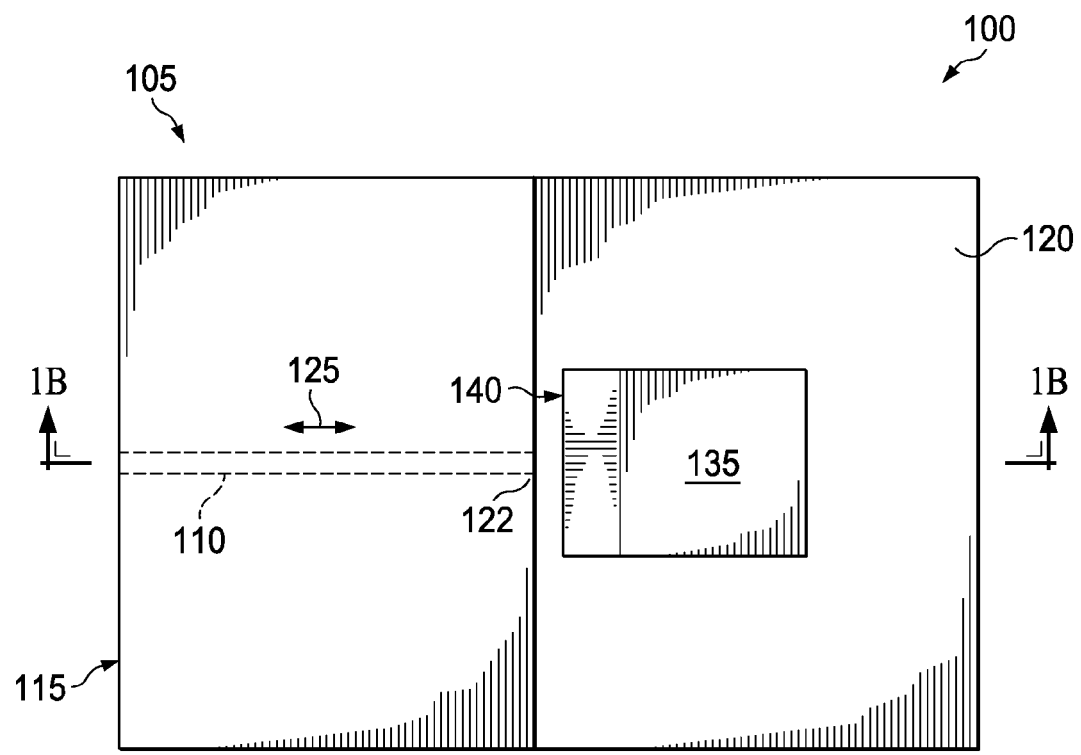
FIGS. 1A-1D show plan and cross-sectional views of an example optical devices of the disclosure having at least one reflecting slanted surface.
Figure 1B:
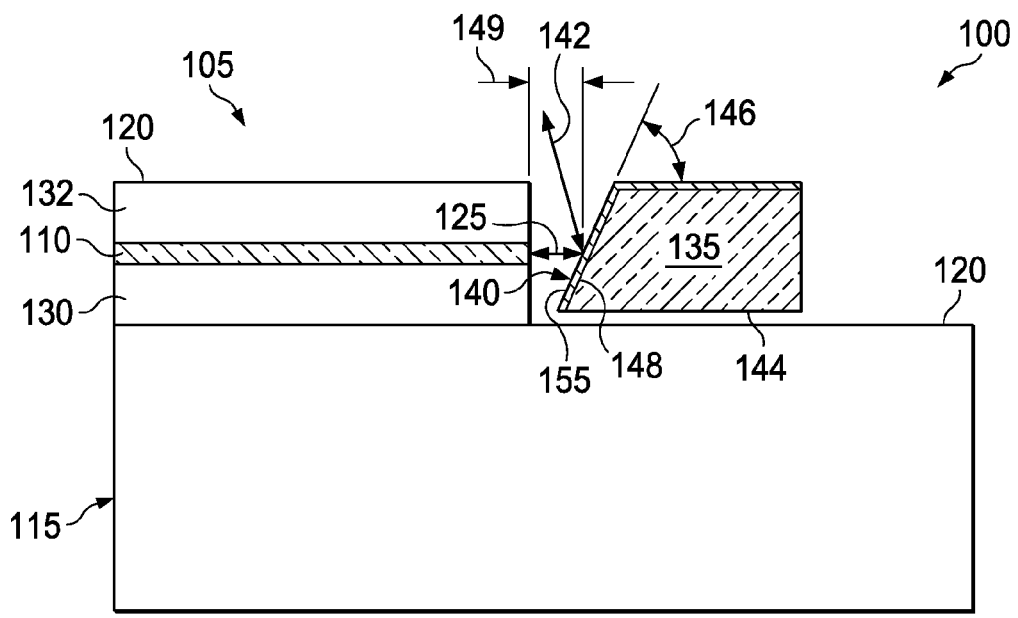

One embodiment of the present disclosure is an optical device. FIGS. 1A and 1B show plan and cross-section views of an example optical device 100 of the disclosure. In some cases, the device 100 can be, or include, a PIC 105.

For the embodiment shown in FIGS. 1A and 1B, the device 100 comprises a waveguide 110 and substrate 115 having a planar surface 120. The optical waveguide 110 is located on and parallel to the surface 120 and having an end 122 located and oriented to emit or receive light propagating substantially parallel (e.g., direction 125) to the planar surface 120. As shown in FIG. 1B, the substrate 115 can include cladding layers 130, 132 to facilitate guiding light through the waveguide 110. The device 100 also comprises a crystalline turning mirror 135 bound to the planar surface 120. The crystalline turning mirror 135 has a reflecting surface 140 that is slanted relative to the planar surface 120.

The term turning mirror 135 as used herein refers to a structure having a least one reflecting surface 140 that reflects the light beam such that the beam's direction (e.g., direction 125) has been turned in a direction (e.g., direction 142) that is non-parallel to the incoming beam's direction 125. The turning mirror 135 is a discrete physically separate structure. For instance, the turning mirror 135 and the substrate 115 (and any layers thereon) are discontinuous structures. For instance, in some embodiments, the crystalline turning mirror 135 has a bottom surface 144 lying along a top surface 120 of the substrate 115. By providing a turning mirror 135 as a discrete structure from that of the substrate 115, a variety of different turning mirror 135 configurations can be bound to the substrate 115 without having to substantially change the design and manufacture of other components of the substrate 115.

The term slanted as used herein refers to the reflecting surface 140 forming an angle 146 with respect to the planar surface 120, that ranges from about 30 to about 70 degrees.

As noted, in some embodiments of the device 100, the substrate 115, the waveguide 110 and the crystalline turning mirror 135 are components of a PIC 105. In some embodiments, the PIC 105 includes an array of the waveguides 110 and the crystalline turning mirrors 135 on the planar surface 120. In some embodiments, the device 100 is configured as an optical telecommunication system. For instance the device 100 can be an optical telecommunication system that comprises a plurality of PICs 105.

In some embodiments, such as shown in FIGS. 1A-1B, the reflecting surface 140 is a planar reflecting surface. However, in other embodiments, the reflecting surface 140 can be curved (e.g., concave or convex shaped). In some embodiments, such as shown in FIG. 1B, the reflecting surface 140 is covered by a metal layer 148 (e.g., gold). In some embodiments, the crystalline turning mirror 135 and the substrate 115 are formed of different materials. For instance, the crystalline turning mirror 135 can be composed of silicon and the substrate 115 can be composed of glass.

In some embodiments, it is desirable to have the reflecting surface 135 very close to the end 122 of the waveguide 110 because then the light being transferred between these two structures does not have the opportunity to substantially diverge. Consequently, a smaller sized detector can be used to detect the light. For instance, in some embodiments, the reflecting surface 140 is separated from the end 122 by a distance 149 of about 20 micrometers or less.

Some embodiments of the device 100 comprise a waveguide 110 and substrate 115 having a planar surface 120. The optical waveguide 110 is located on and parallel to the surface 120 and having an end 122 located and oriented to emit or receive light propagating substantially parallel (e.g., direction 125) to the planar surface 120. The device 100 also comprises a crystalline turning mirror 135 bound to the planar surface 120. The crystalline turning mirror 135 has a reflecting surface 140 that is slanted relative to the planar surface 120 and a bottom surface 144 along the planar surface 120. The crystalline turning mirror 135 and the substrate 115 are formed of different materials.

Figure 1C:
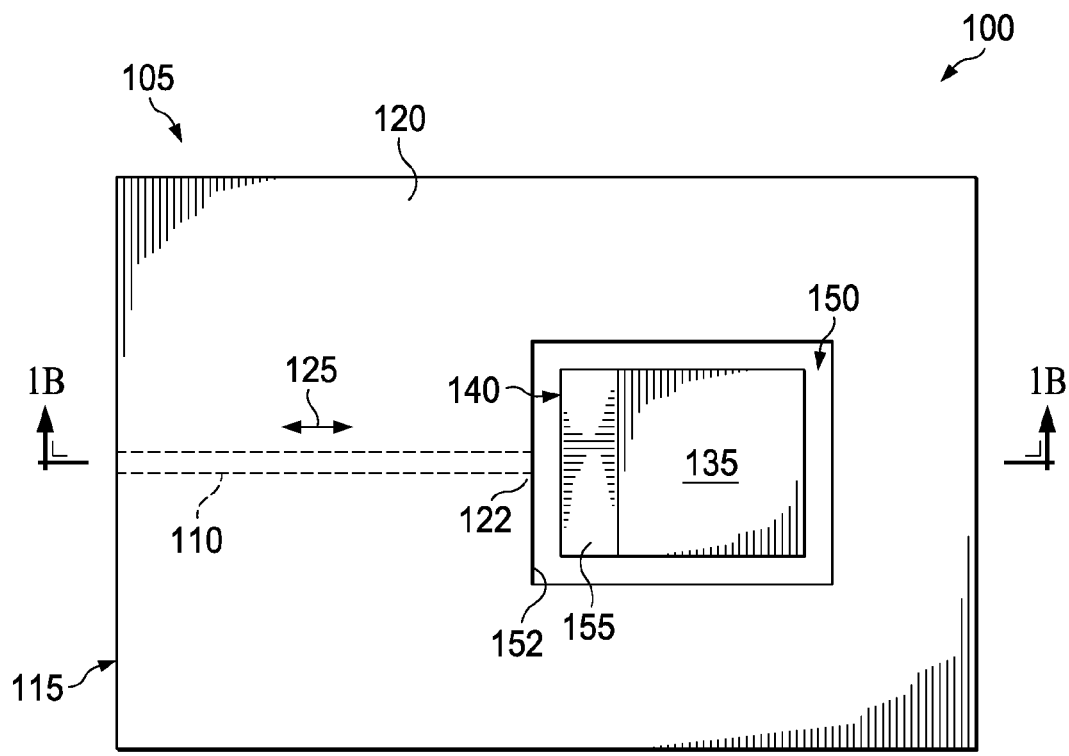
Figure 1D:
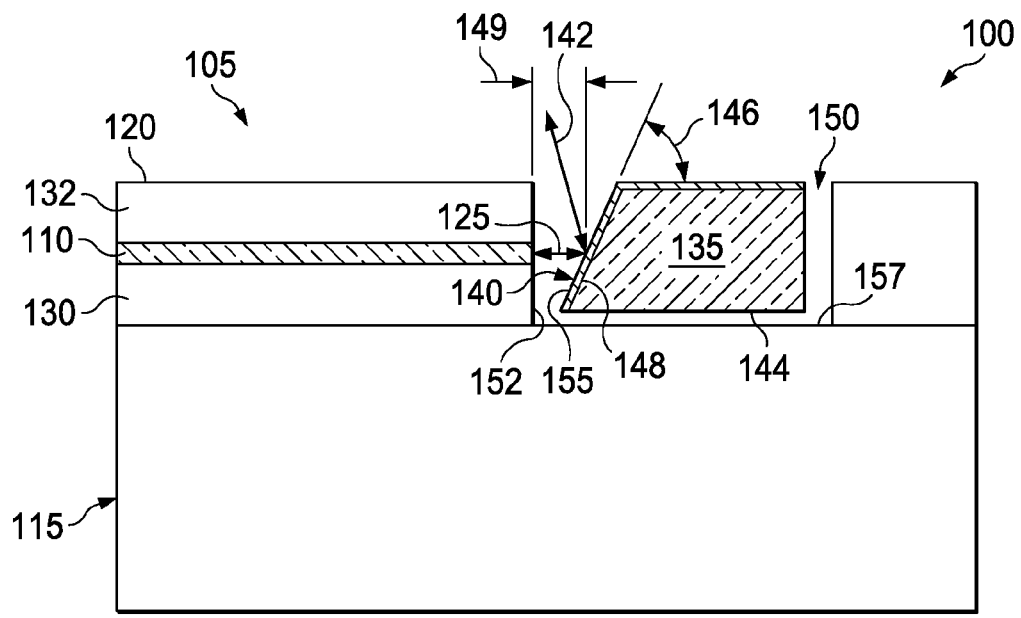

FIGS. 1C and 1D show plan and cross-section views of another example optical device 100 of the disclosure. For the embodiment shown in FIGS. 1C and 1D, the optical device 100 comprises a PIC 105 that includes one or more optical waveguides 110 located on the substrate 115. The waveguides 110 are configured to guide light in a direction 125 that is parallel to the planar surface 120 (e.g., a horizontal mounting surface) of the substrate 115. The PIC 105 also includes one or more cavities 150 located on the substrate 115. One end 122 of the waveguides 110 terminates at an interior wall 152 of one of the cavities 150.

At least a portion of the crystalline turning mirror 135 is located in a cavity 150 on the planar surface 120. Mounting the turning mirror 135 in the cavity 150 can facilitate producing an optical device 100 with a low vertical profile. Consequently, the assembly of such devices 100 are more conducive to mass-assembly processes, such as flip-chip assembly processes. In some embodiments at least a portion of the crystalline turning mirror 135 is part of a cavity 150 of an optical resonator located on the planar surface 120.

At least a portion (and in some cases, the entire turning mirror 135) of each of the turning mirrors 135 fits into one of the cavities 150. That is, the shape of the portion of the turning mirror 135 (or entire mirror in some cases) can fit in one of the cavities 150 because it matches or conforms with the shape of the cavity 150 and is slightly smaller than the cavity 150.

At least one sidewall 155 of each of the turning mirrors 135 has a reflecting surface 140 facing the end 122 of one of the waveguides 110. The reflecting surface 140 is slanted relative to the planar surface 120.

In some embodiments of the devices 100, the reflecting surface 140 is configured to reflect the light emanating from the waveguide 110 and into the cavity 150 in a direction (e.g., direction 142) that is non-parallel to the planar surface 120. In other embodiments of the device 100, the reflecting surface 140 is configured to reflect the light emanating from a direction (e.g., direction 142) that is non-parallel with the planar surface 120 to a direction 125 that is planar surface 120 and into the waveguide 110.

Figure 2A:
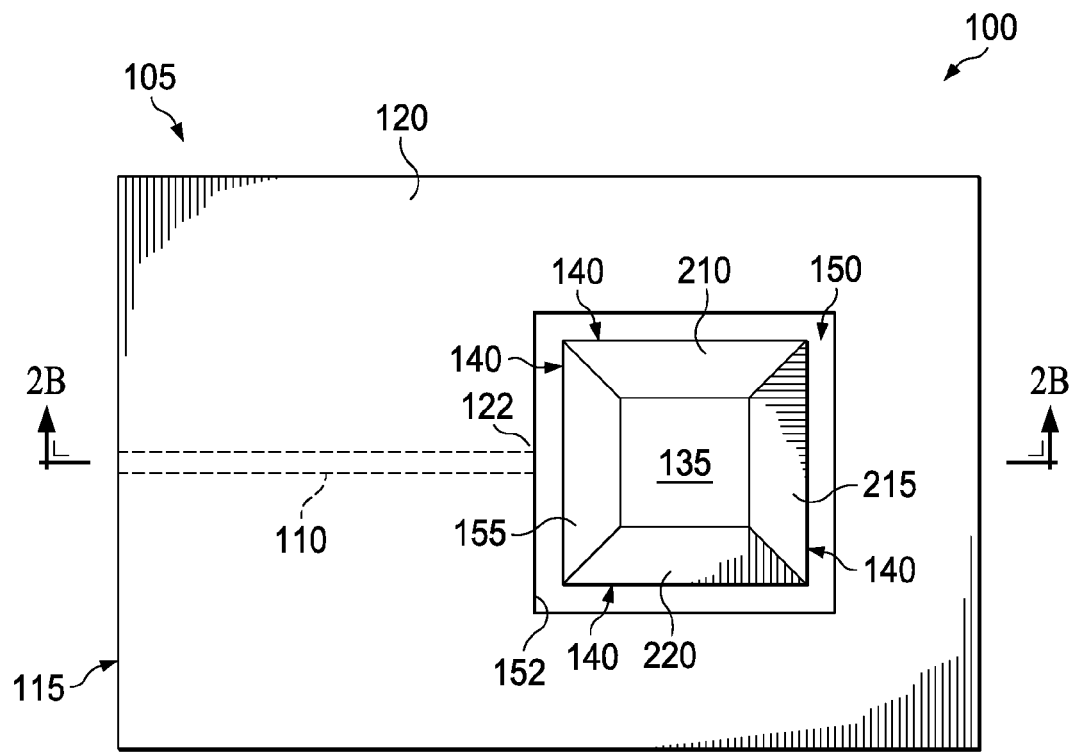
FIGS. 2A-2B show plan and cross-sectional views of an example optical device of the disclosure having a plurality of reflecting slanted surfaces.
Figure 2B:
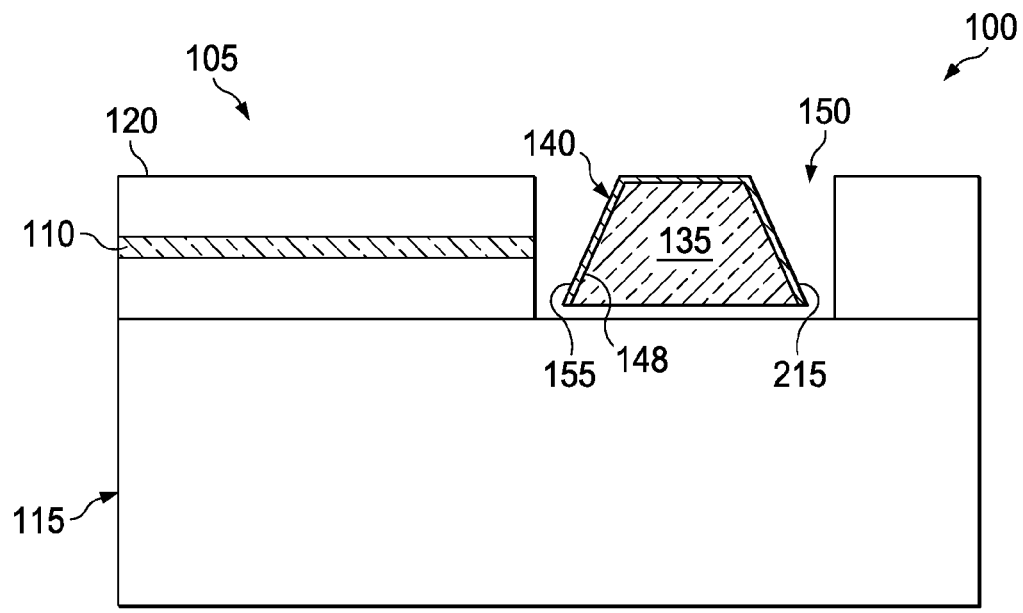

FIGS. 2A and 2B show plan and cross-section views of another example optical device 100 of the disclosure. As illustrated, in some embodiments of the optical device 100, all of the sidewalls 155, 210, 215, 220 of the turning mirrors 135 have substantially identical slanted reflecting surfaces 140. An advantage of such a configuration is that it ensures that the reflecting surface 140 will face the end 122 of the waveguide 110, regardless of how the turning mirror 135 is horizontally oriented in the cavity 150.

Figure 3A:
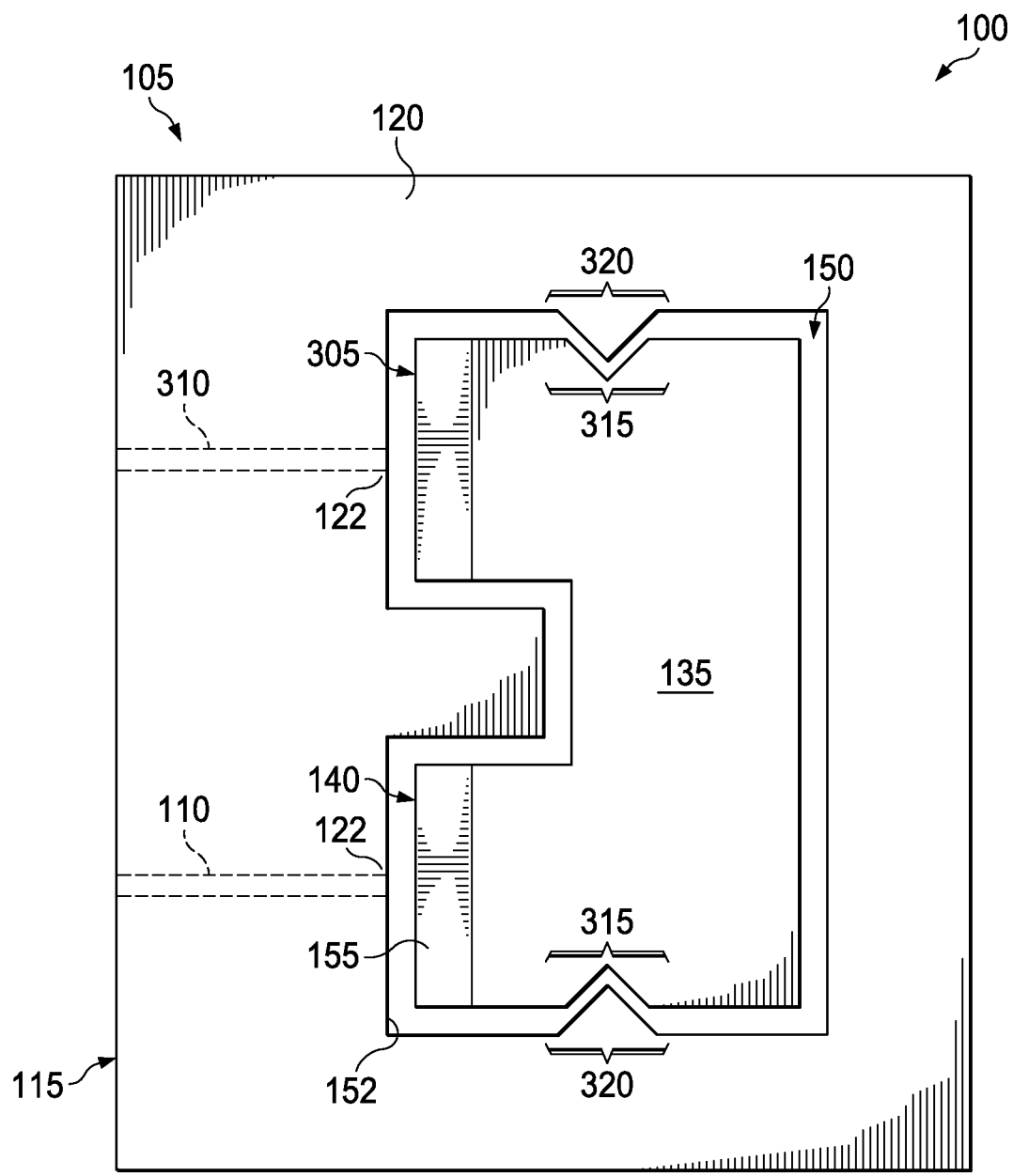
FIGS. 3A-3C show plan and cross-sectional views of example optical devices of the disclosure having one or more reflecting slanted surfaces and alignment features.

FIG. 3A shows a plan view of yet another example optical device 100 of the disclosure. As illustrated, in some embodiments of the optical device 100, the sidewall 155 of at least one turning mirror 135 further includes a second reflecting surface 305, that is separated from the reflecting surface 140, and, the second reflecting surface 305 faces a second one of the waveguides 310. In some cases, each one of the turning mirrors 135 can have a plurality of such, separated reflecting surfaces 140, 305.

In some embodiments, the shape of the turning mirrors 135 in a plane parallel to the planar surface 120 is configured to match a shape of the cavity. For instance, as illustrated in FIG. 1C, in some cases when the cavity 150 is rectangular-shaped, then the shape of the turning mirror 135 has a matching rectangular shape in the plane of the planar surface 120. In some cases, the cavity's shape, and the corresponding shape of the turning mirror, could be configured to have an asymmetric shape such that the turning mirror can only fit in the cavity in one orientation, such that the reflecting surface faces the waveguide.

In some cases, at least one of the interior walls or a base (e.g., interior walls 152 or base 157 as depicted in FIG. 1D) of the cavity includes one or more alignment-features, and, at least one side of the turning mirror includes corresponding alignment-features which fit the alignment-features. If, e.g., the alignment feature projects out from the interior wall or base of the cavity, then the corresponding alignment feature projects into the turning mirror by a substantially equal and opposite amount. For instance, as shown in FIG. 3A, two opposing interior walls 152 of the cavity 150 have v-shaped notches outward-projecting alignment features 315, and, two side walls 155 having corresponding v-shaped inward-projecting notch alignment features 320. In other embodiments, the cavity's alignment features 315 and the corresponding turning mirror's alignment features 320 are notches having other shapes (e.g., square, hemisphere, etc. . . . . . ).

Based on the present disclosure one skilled in the art would understand how the one or more alignment-features 315 can have a variety of shapes that either projects into or out of one or more of the interior walls 152, and, how the corresponding alignment-feature 320 of the turning mirror 135 can have an inverse or complimentary shape that either projects out of or into the sidewall 155, respectively. For instance, in some cases, the alignment features 315 on the interior walls 152 can project inwards while the corresponding alignment features 320 on the sidewalls 155 project outwards.

Figure 3B:
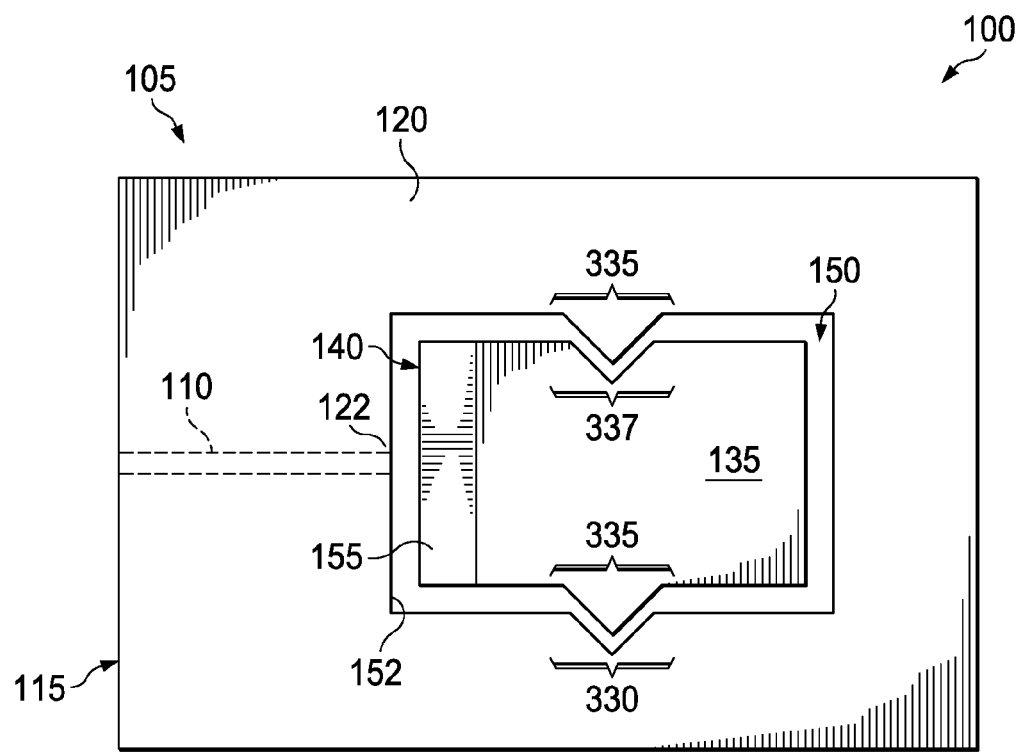

In some cases, to facilitate having the turning mirror 135 fit into the cavity 150 in only one orientation, the alignment-features can be asymmetrically shaped or asymmetrically positioned on the interior walls 152. This helps to ensure that the reflecting surface 140 will face the waveguide 110. For instance, FIG. 3B shows a plan view of still another example optical device 100 of the disclosure. As illustrated, one of the interior walls 152 (or base in other embodiments) has a first alignment feature 330 (e.g., an inward projecting notch) and another one of the interior walls 152 (or base) has a differently-shaped alignment feature 332 (e.g., an outward projecting notch). As further illustrated, the turning mirror 135 includes corresponding alignment features, 335, 337.

Figure 3C:
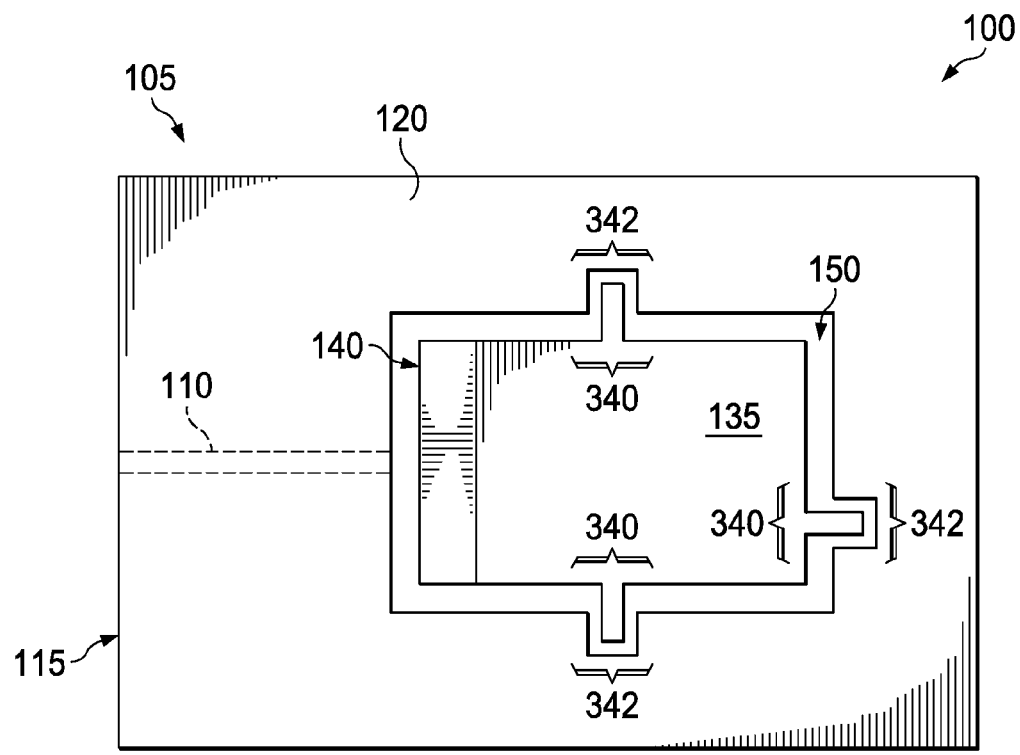

In some cases, the turning mirrors include one or more tethering remnants on one or more sidewalls 155 or bottom surface 144 (FIG. 1D) of the turning mirror. One skilled in the art would understand how tethers can be used in the fabrication of the turning mirror to hold the mirror to a substrate while the mirror is being formed from the substrate. Once the mirror is formed, the tethers can be broken, leaving tethering remnants on the mirror's sidewalls or base. Example tethering remnants are illustrated in FIG. 3C which shows a plan view of another example optical device 100 of the disclosure. As illustrated, side walls 155 (or the bottom surface 144, FIG. 1D) have tethering remnants which can also be alignment-features 340 that correspond to inward projecting alignment features 342 on the interior walls 152 of the cavity 150. As further illustrated in FIG. 3C, the turning mirror can be configured such that the alignment features 342 and corresponding alignment-features 340 of the turning mirror 135, are asymmetrically positioned, on the interior walls 152 and side walls 155, respectively, to facilitate the desired orientation of the reflecting surface 140 to face the end 122 of the waveguide 110.

Figure 4A:
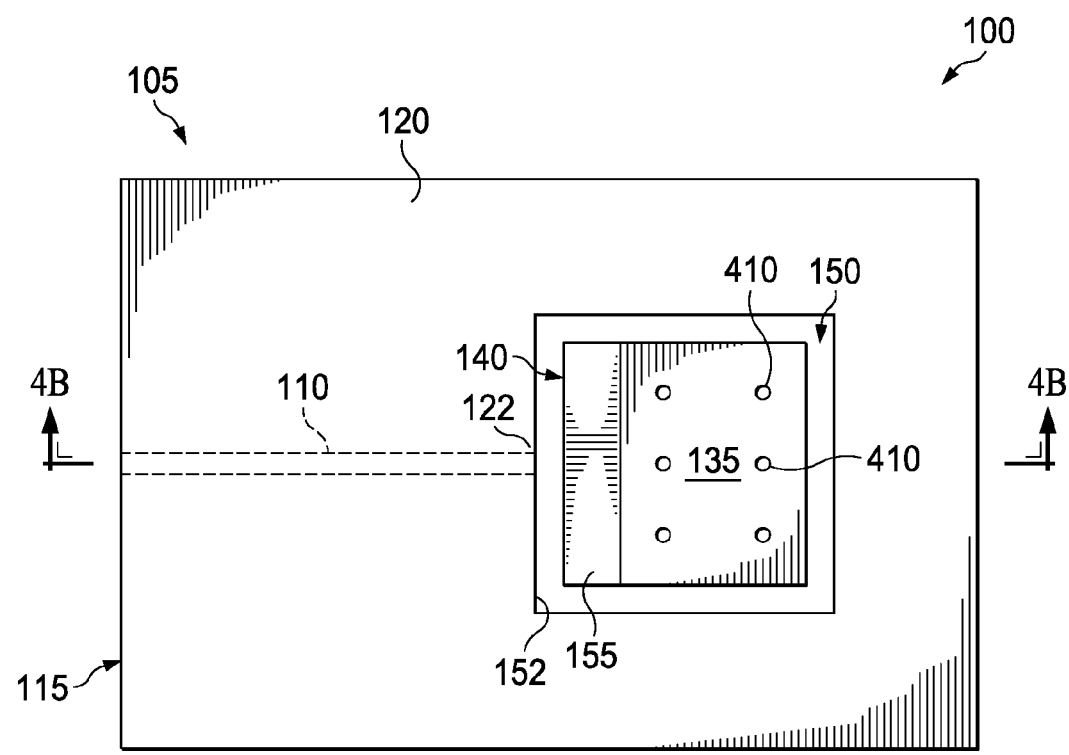
FIGS. 4A-4B show plan and cross-section views of an example optical devices of the disclosure having at least one reflecting slanted surface.
Figure 4B:
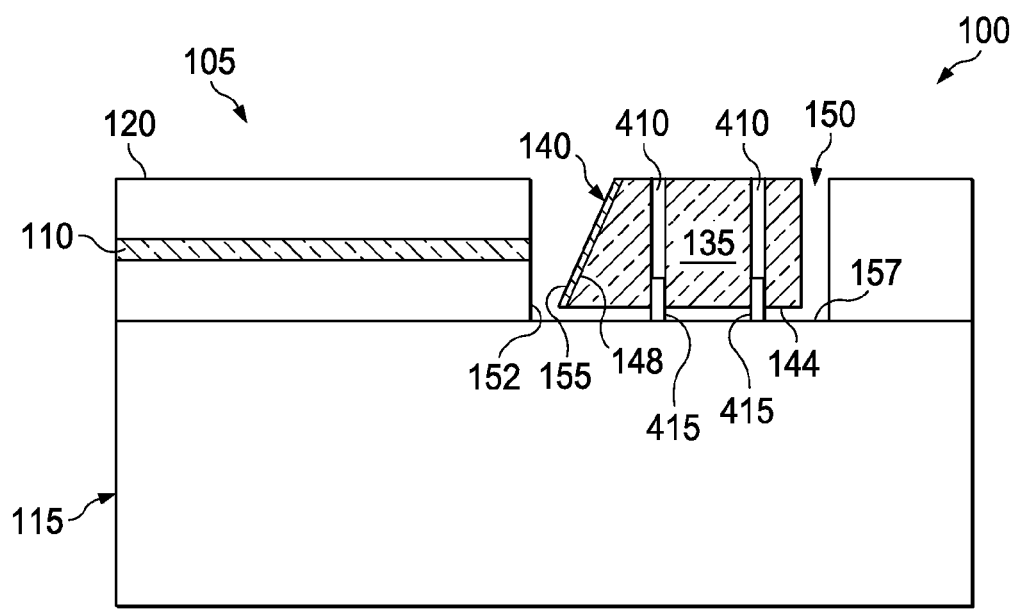

In some cases, the turning mirrors can include one or more etch release holes. One skilled in the art would understand how etch release holes can be used in the fabrication of the turning mirror to facilitate releasing the mirror from a substrate that the mirror is manufactured from. In some cases, the etch release holes can be used as alignment features. For instance, FIGS. 4A and 4B show plan and cross-section views, respectively, of yet another embodiment of the optical device 100. One or more etch release holes 410 are located on a bottom surface 144 of the turning mirror 135. As shown in FIG. 4B, the etch release holes 410 can vertically traverse the mirror 135. As further illustrated in FIG. 4B, the etch release holes 410 can be corresponding alignment-features for alignment features 415 (e.g., outward projecting posts) on the cavity base 157.

Figure 5A:
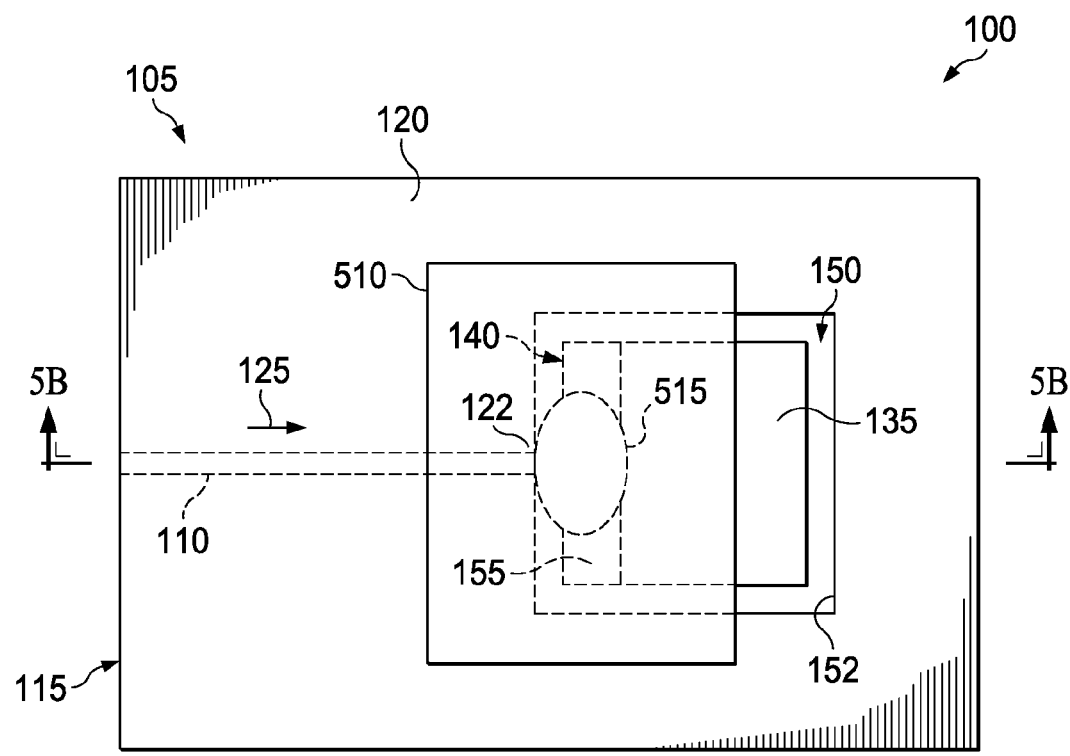
FIGS. 5A-5C show plan and cross-section views of example optical devices of the disclosure having a photodetector or light source optically coupled to a reflecting slanted surface of the device.
Figure 5B:
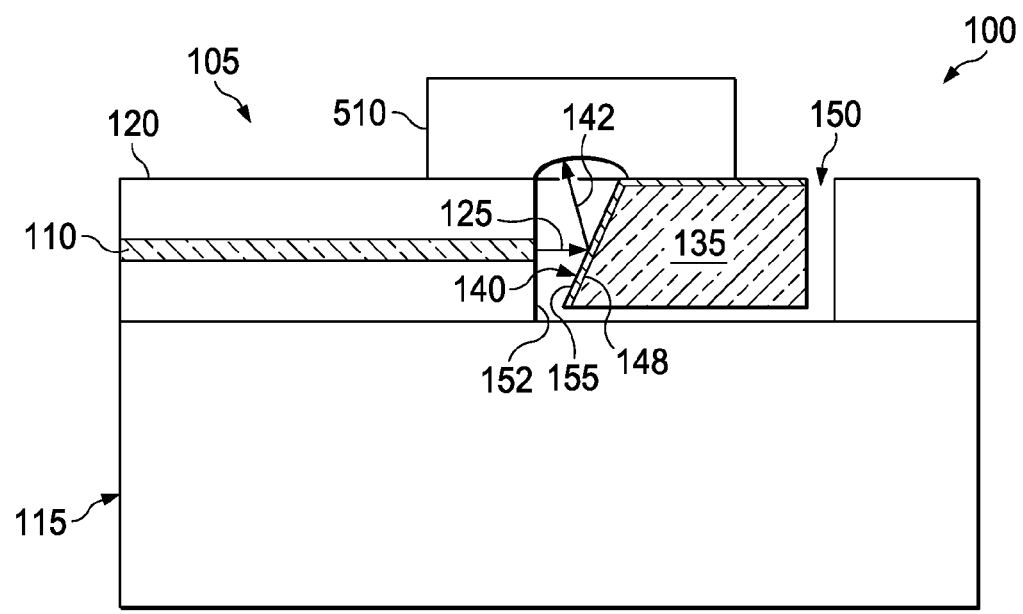

One skilled in the art would be familiar with other components that could be included in the device 100. For instance, FIGS. 5A and 5B show plan and cross-sectional views, respectively, of the device 100 which can further include one or more photo-detectors 510 located on the planar surface 120. Each photo-detector 510 can be configured to receive light reflected from one of the reflecting surfaces 140 turning mirrors 135. For instance, the light sensor 515 of the photo-detector 510 (e.g., a photodiode) can be aligned such that light directed through the waveguide 110 (e.g., in direction 125) and reflected off of the reflecting surface 140.

Figure 5C:
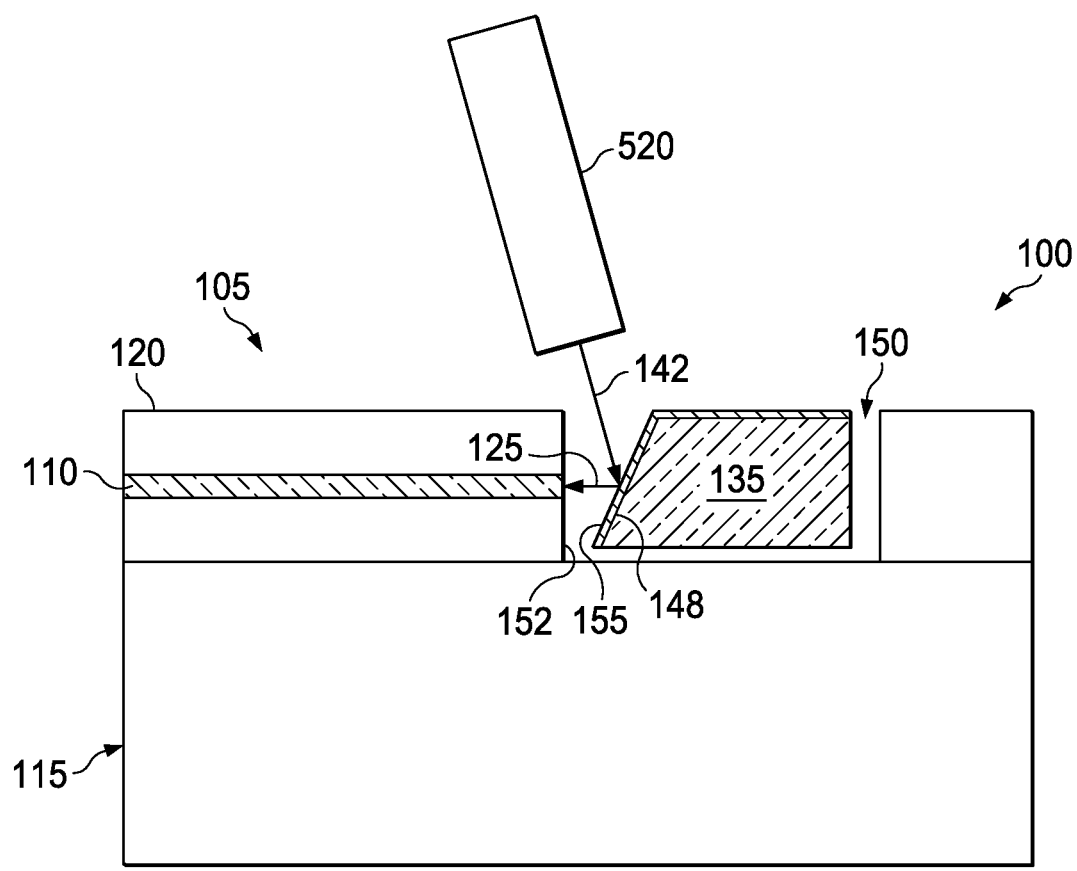

For instance, FIG. 5C shows a cross-sectional view, analogous to that shown in FIG. 5B, of another embodiment of the device 100 further including a light-source 520 (e.g., laser or optical fiber) which directs the light in a direction (e.g., direction 142) that is non-parallel to the planar surface 120, towards the reflecting surfaces 140. The light reflected off of the reflecting surface travels in a direction (e.g., direction 125) parallel to planar surface 120 into the waveguide 110.

Figure 6A:
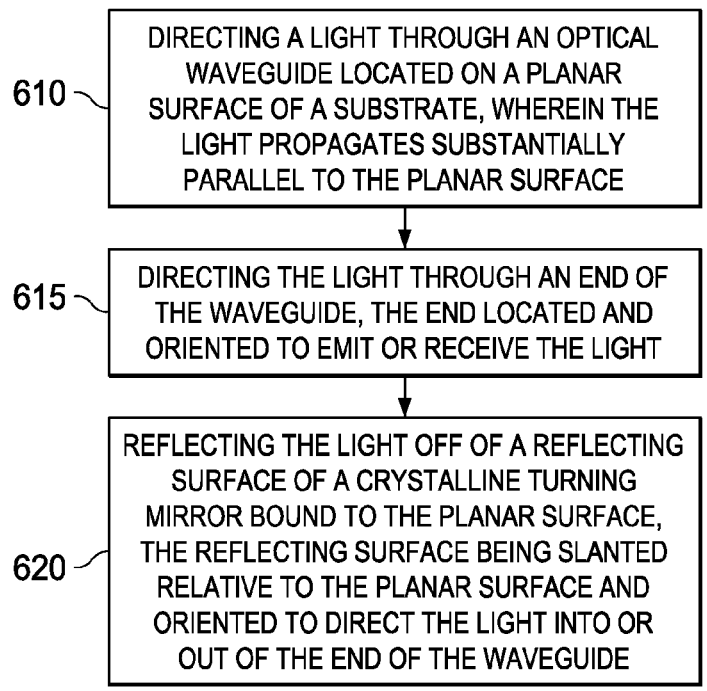
FIGS. 6A-6C presents a flow diagrams of example methods of using an optical device in accordance with the disclosure, such as using any of the devices 100 discussed in the context of FIGS. 1A-5C.

Another embodiment of the disclosure is a method of using an optical device. FIG. 6A presents a flow diagram of an example method of using an optical device in accordance with the disclosure, such as using any of the devices 100 discussed in the context of FIGS. 1A-5C.

With continuing reference to FIGS. 1A-1B, the method comprises a step 610 of directing a light through an optical waveguide 110 located on a planar surface 120 of a substrate 115, wherein the light propagates substantially parallel to the planar surface (e.g., in direction 125). The method also comprises a step 615 of directing the light through an end 122 of the waveguide 110, the end 122 located and oriented to emit or receive the light. The method further comprises a step 620 of reflecting the light off of a reflecting surface 140 of a crystalline turning mirror 135 bound to the planar surface 120, the reflecting surface 140 being slanted relative to the planar surface 120 and oriented to direct the light (e.g., direction 125) into or out of the end 122 of the waveguide 110.

In some cases, the light directed through the end 122 of the waveguide 110 is then reflected off of the reflecting surface 140 in a direction 142 that is non-parallel to the planar surface 120. The reflected light can then be received by a photo-detector 510 (FIG. 5A) located on the planar surface 120.

In some cases the light reflected off of the reflecting surface 140 is in a direction 125 that is parallel to the planar surface 120 and into the end 122 of the waveguide 110. In such cases, the light can be directed (e.g., in direction 142) toward the reflecting surface 140 from a light-source 520 (FIG. 5C) located above the planar surface 120.

Figure 6B:
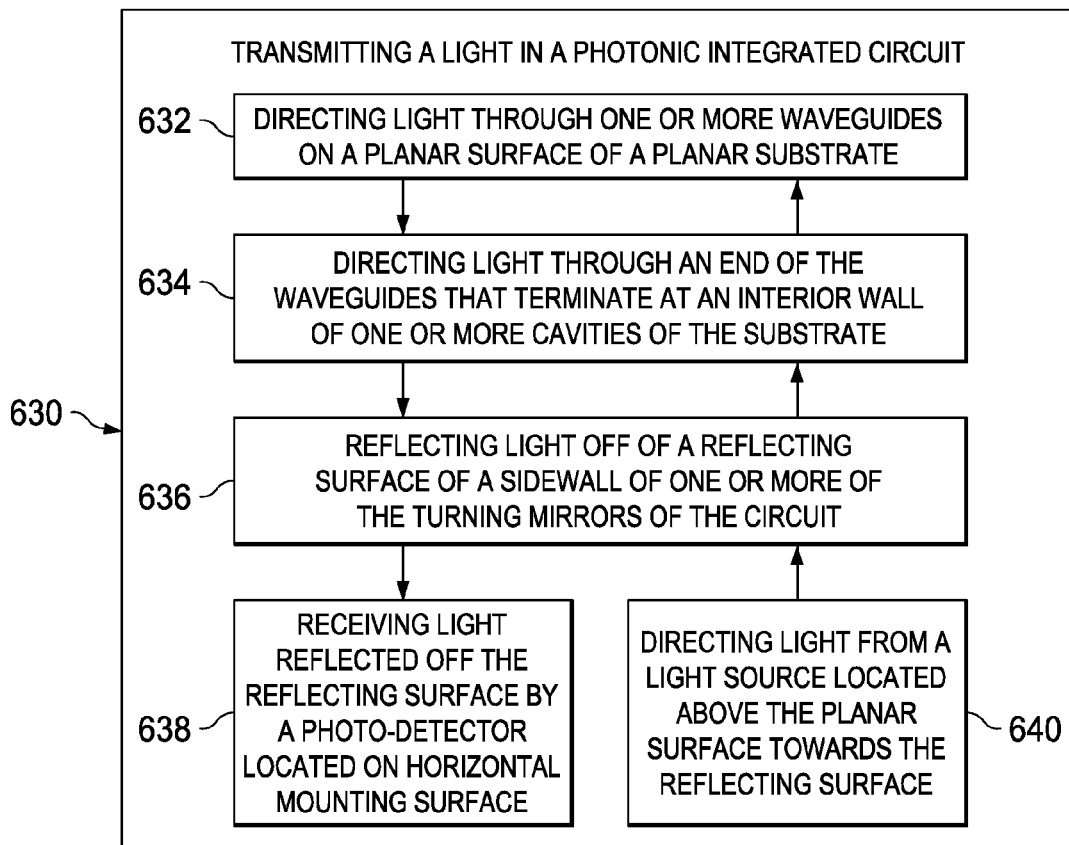

FIG. 6B presents a flow diagram of another example method of using an optical device in accordance with the disclosure, such as using any of the devices 100 discussed in the context of FIGS. 1A-5C. With continuing reference to FIGS. 5A-5C, the method comprises a step 630 of transmitting a light in a photonic integrated circuit 105. Transmitting the light in step 630 includes a step 632 of directing the light (e.g., in direction 125) through one or more waveguides 110 located on a planar surface 120 of a substrate 115 of the circuit 105. In some cases, directing the light in step 632 can include transmitting the light to the waveguide 110. Transmitting the light in step 630 includes a step 634 of directing the light (e.g., in direction 142) through an end 122 of the waveguides 110 that terminate at an interior wall 152 of one or more cavities 150 of the substrate 115. In some cases directing the light in step 634 can include emitting light from the end 122 of the waveguide 110. Transmitting the light in step 630 also includes a step 636 of reflecting the light off of a reflecting surface 140 of a sidewall 155 of one or more of the turning mirrors 125 of the circuit 105 (e.g., any of the turning mirrors discussed in the context of FIGS. 1A-5C).

In some cases, the light directed through the end 122 of the waveguide 110 in step 634 is then reflected off of the reflecting surface 140, in step 636, in a direction 142 that is non-parallel to the planar surface 120. In such cases, the light reflected off the reflecting surface in step 636 can then be received, in step 638, by a photo-detector 510 located on said planar surface 120.

In other cases, the light reflected off of the reflecting surface 140 in step 636 is reflected in a direction that is parallel to said planar surface and the end 122 of one of the waveguides in step 634. In such cases, the light can be directed in step 640 from above the planar surface 120 towards the reflecting surface 140. E.g., as shown by the cross-section view in FIG. 5C, in some embodiments of the device 100 the light in step 640 can emanate directly from a light-source 520 (not shown), such as a laser or optical fiber, that is pointed at the reflecting surface. Or, the light can emanate indirectly in step 640 from another turning mirror located on the mounting surface 120 (not shown) that in turn receives light from the light-source 520 and direct the light down to the turning mirror 135.

Figure 6C:
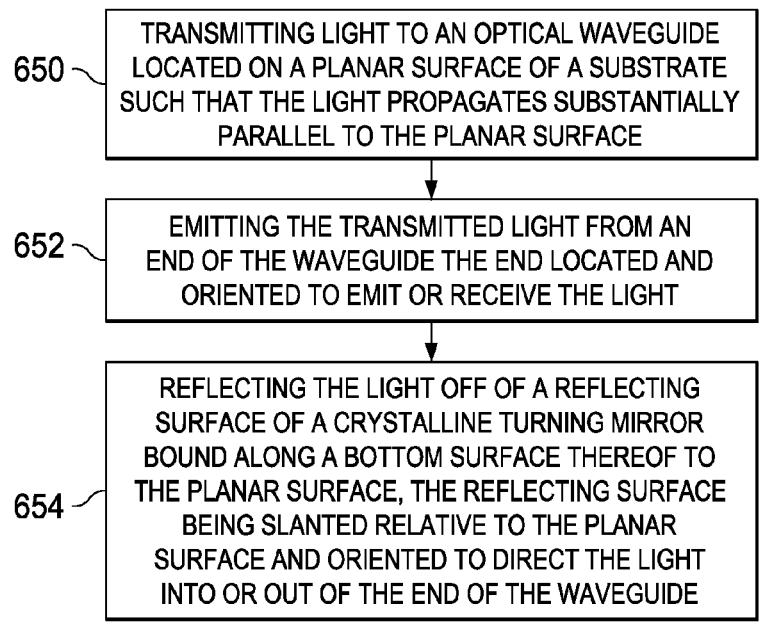

FIG. 6C presents a flow diagram of another example method of using an optical device in accordance with the disclosure, such as using any of the devices 100 discussed in the context of FIGS. 1A-5C. With continuing reference to FIGS. 5A-5C, the method comprises a step 650 of transmitting light to an optical waveguide 110 located on a planar surface 120 of a substrate 115 such that the light propagates substantially parallel to the planar surface 120 (e.g., in direction 125). The method also comprises a step 652 of emitting the transmitted light from an end 122 of the waveguide 110, the end 122 located and oriented to emit or receive the light. The method further comprises a step 654 of reflecting the light off of a reflecting surface 140 of a crystalline turning mirror 135 bound along a bottom surface 144 thereof to the planar surface 120, the reflecting surface 140 being slanted relative to the planar surface 120 and oriented to direct the light (e.g., direction 125) into or out of the end 122 of the waveguide 110.

In some cases, the light emitted from the end 122 of the waveguide 110 is reflected off of the reflecting surface 140 in a direction 142 that is non-parallel to the planar surface 120.

In some cases, the light reflected off of the reflecting surface 140 in a direction 125 parallel to the planar surface 120 and into the end 122 of the waveguide 110. In such cases, the light can be directed (e.g., in direction 142) toward the reflecting surface 140 from a light-source 520 (FIG. 5C) located above the planar surface 120.

Figure 7A:
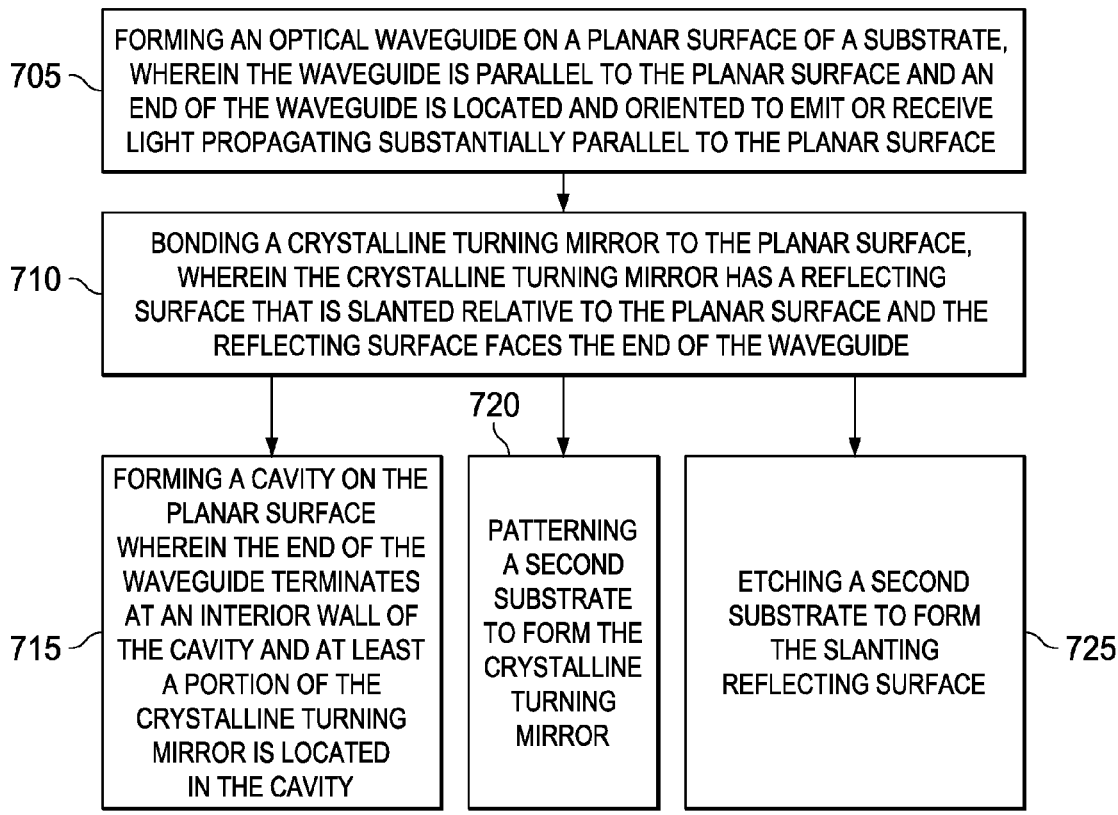
FIGS. 7A-7B presents a flow diagram of example methods of manufacturing an optical device in accordance with the disclosure, such as any of the optical devices discussed in the context of FIGS. 1A-6B.

Another embodiment of the disclosure is a method of manufacturing an optical device. FIG. 7A presents a flow diagram of an example method of manufacturing an optical device in accordance with the disclosure, such as any of the optical devices discussed in the context of FIGS. 1A-6C.

The method embodiment depicted in FIG. 7A comprises a step 705 of forming an optical waveguide 110 on a planar surface 120 of a substrate 115. The waveguide 110 is parallel to the planar surface 120 and an end 122 of the waveguide 110 is located and oriented to emit or receive light propagating substantially parallel to the planar surface 120 (e.g., in direction 125). The method also comprises a step 710 of bonding a crystalline turning mirror 135 to the planar surface 120. The crystalline turning mirror 135 (e.g., the bonded mirror) has a reflecting surface 140 that is slanted relative to the planar surface 120 and the reflecting surface 140 faces the end 122 of the waveguide 110.

In some cases, the method further includes a step 715 of forming a cavity 150 (e.g., an optical resonant cavity) on the planar surface 120 wherein the end 122 of the waveguide 110 terminates at an interior wall 152 of the cavity 150 and at least a portion of the crystalline turning mirror 135 is located in the cavity 150.

In some cases, at least a portion of the crystalline turning mirror 135 is located along a wall 152 of the cavity 150.

In some cases, the method further includes a step 720 of patterning a second substrate to form the crystalline tuning mirror 135. In some cases, the method further includes a step 725 of etching a second substrate to form the slanting reflecting surface 140.

Figure 7B:
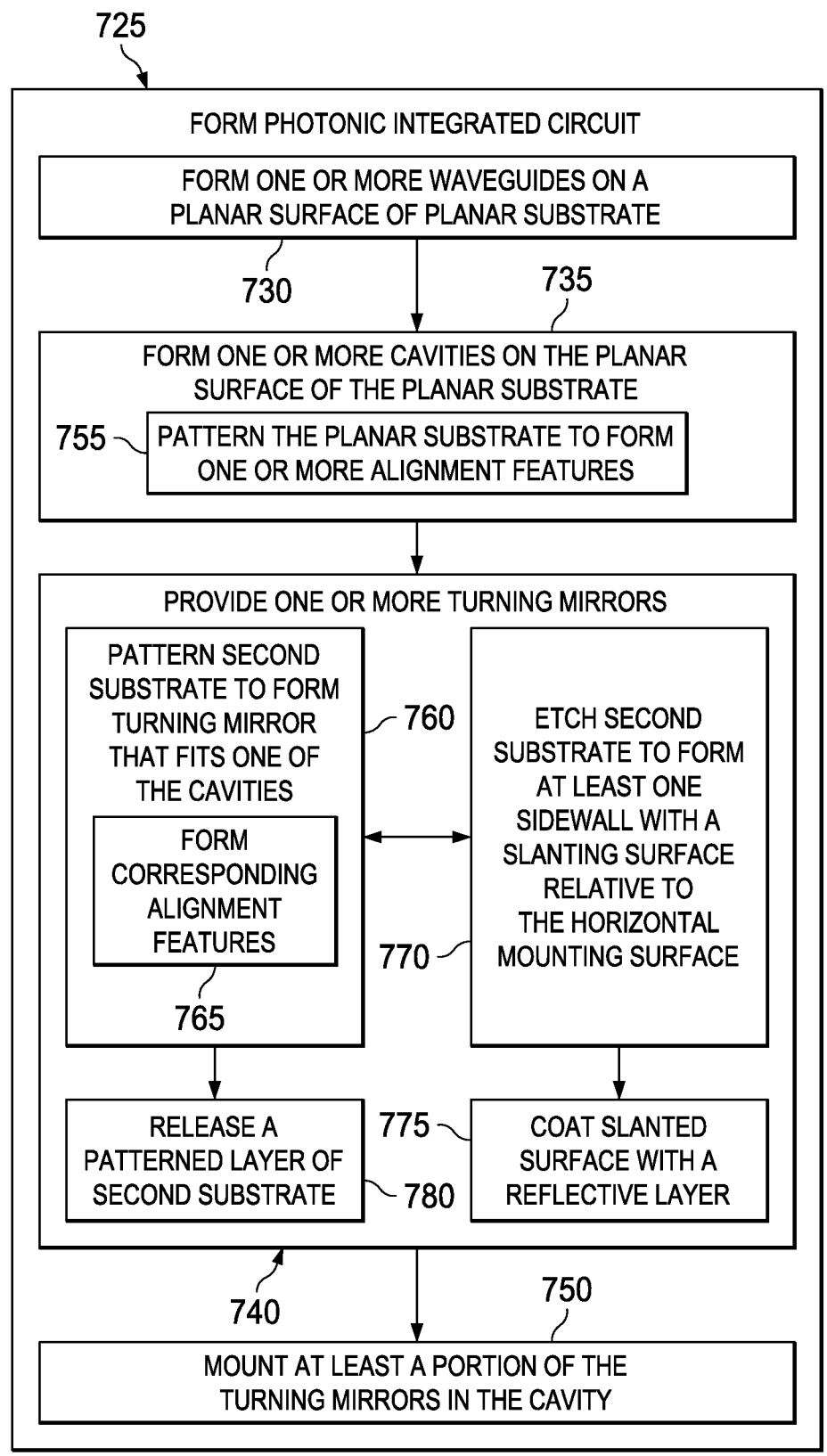

FIG. 7B presents a flow diagram of another example method of manufacturing an optical device in accordance with the disclosure, such as any of the optical devices discussed in the context of FIGS. 1A-6B.

The method embodiment depicted in FIG. 7B comprise a step 725 of forming a PIC 105. Forming the PIC 105 (step 725) includes a step 735 of forming one or more waveguide 110 on a planar surface 120 of a substrate 115, and, a step 740 forming one or more cavities 150 on the substrate 115 (FIGS. 1C-1D), such that one end 122 of waveguides 110 terminates at an interior wall 152 of the cavity 150. Forming the PIC 105 (step 725) also includes a step 745 of providing one or more turning mirrors 135, each having at least one sidewall 155 with a reflective surface 140. Forming the PIC 105 (step 725) further includes a step 750 of mounting at least a portion of at least one of the turning mirrors 135 into one of the cavities 150. Mounting (step 750) is done such that the reflective surface 140 faces the waveguide's 110 end 122, and such that the reflecting surface 140 is slanted relative to the planar surface 120.

Forming the waveguide 110 in step 735 and the cavities 150 in step 740 can both include photolithographic patterning and etching processes that are well known to those skilled in the art. In some cases, forming the cavities 150 (step 740) includes a step 755 of patterning the substrate 115 such that at least one interior wall 152 or base 157 of the cavity further includes at least one alignment feature (e.g., one or more features 320, 335, 337, 342, 415 of FIGS. 1A-4B).

In some embodiments, providing the turning mirror 135 (step 745) further includes a step 760 of patterning a second substrate such that at least the mounting portion of the turning mirror 135 has a shape that fits in one of the cavities 150.

In some cases, the patterning step 760 further includes a step 765 of forming an alignment feature (e.g., one or more corresponding features 315, 335, 337, 340, 410 of FIGS. 1A-4B) in one or more sidewalls 155 or bottom surface 144 of the mounting portion that corresponds to the alignment feature on the interior wall 152 or base 157 of one of the cavities 150, when the turning mirror 135 is mounted in the cavity 150. In some cases, the patterning step 760 further includes a step 767 of forming release holes 410 (FIG. 4A-4B) in the turning mirror 135.

In some cases, providing the turning mirror 135 (745) further includes a step 770 of etching a second substrate to form at least one sidewall 155 with a slanted surface (e.g., the sidewall 155 having an the angle 146 relative to the planar surface 120; FIG. 1B). In some cases, it is advantageous for the patterning step 760 (including step 765) to be done before the etching step 770 to form the slanted surface. For instance, patterning 760 via reactive ion etching (RIE) can produce narrower trenches in the second substrate compared to an anisotropic wet etch step 770. As a result, the patterned second substrate is more conducive to further photolithographic processing than the etched second substrate because the former can have a more uniformly planar surface.

In some cases, providing the turning mirror (745) further includes a step 775 of coating the slanted reflecting surface 140 with a reflective layer 142 (e.g., via metal evaporation processes).

In some embodiments, providing the turning mirror (745) further includes a step 780 of releasing a patterned layer of a second substrate. For instance, hydrofluoric acid etchant can be transferred through release holes 410 (FIG. 4A) in the patterned layer of the second substrate to dissolve a layer of the second substrate, thereby releasing the patterned turning mirror 135.

FIGS. 8A-16B present plan and cross-sectional views analogous to that shown in FIGS. 1A and 1B, respectively, of selected steps in an example method of manufacturing of an example optical device 100 in accordance with the disclosed method of manufacture, such as presented in the flow diagrams in FIGS. 7A or 7B.

Figure 8A:
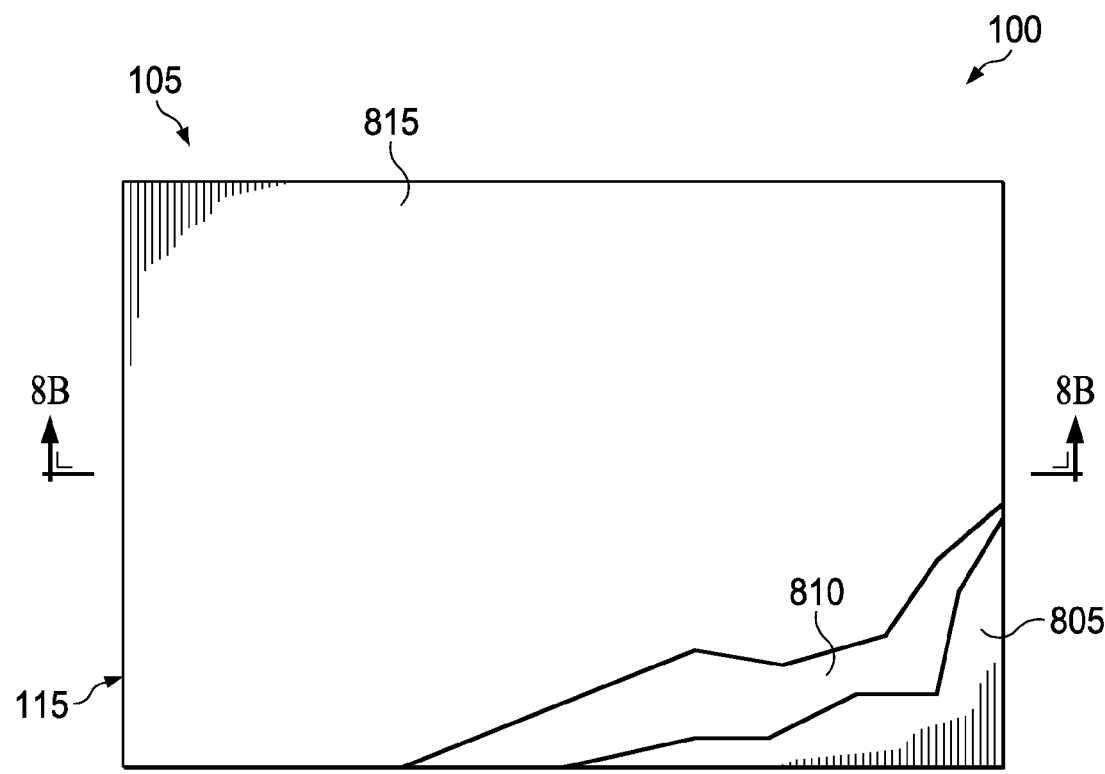
FIGS. 8A-16B present plan and cross-sectional views analogous to that shown in FIGS. 1A-5C, of selected steps in an example method of manufacturing of an example optical device in accordance with the disclosed method of manufacture, such as presented in the flow diagrams in FIGS. 7A or 7B.
Figure 8B:
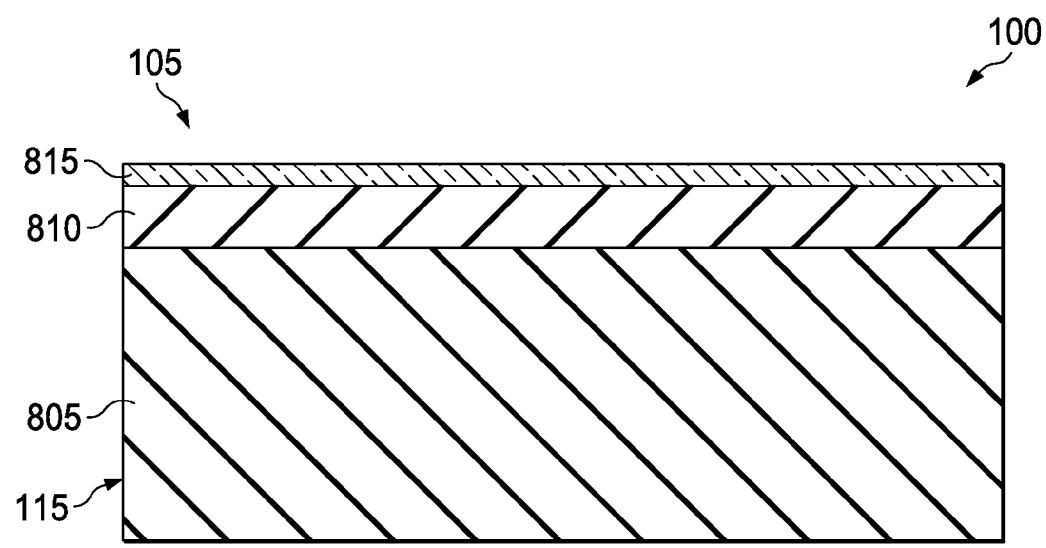

FIGS. 8A and 8B show an example substrate 115 of the device 100, such as a silicon substrate, having a silicon base layer 805, lower layer 810 (e.g., silicon oxide) and core layer 815 (e.g., glass). In FIG. 8A, portions of the silicon oxide layer 810 and core layer 815 are not shown so that underlying layers, 805, 810 can be depicted.

Figure 9A:
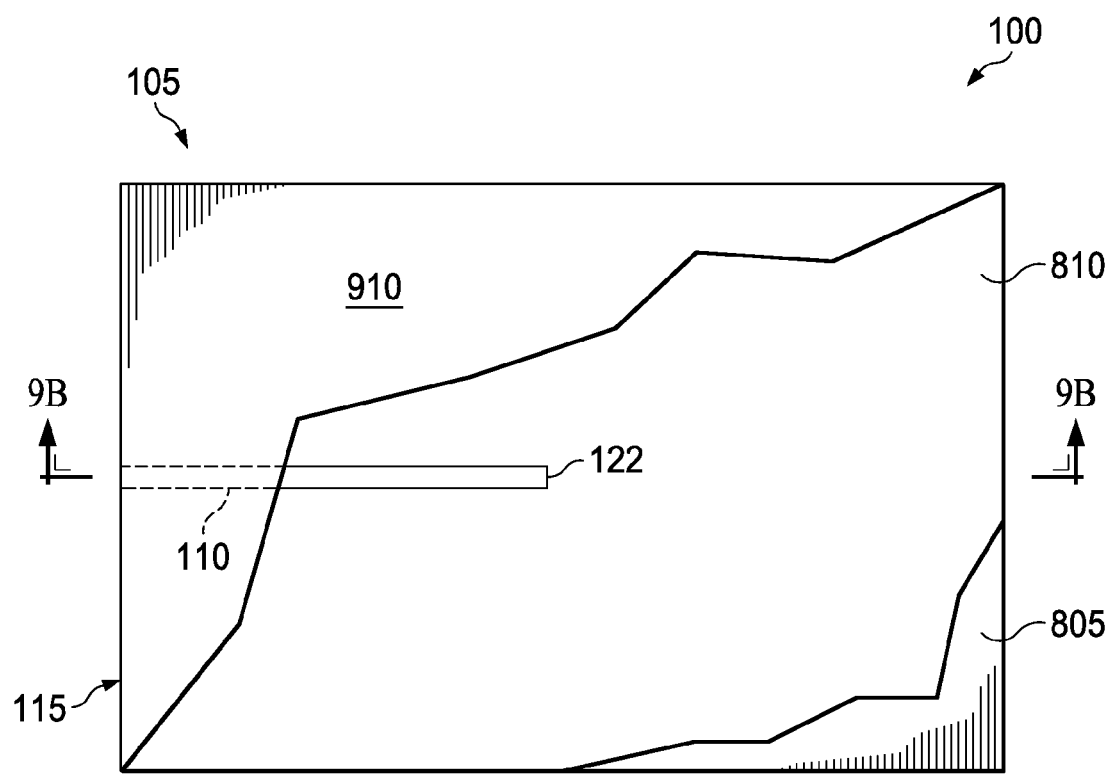
Figure 9B:
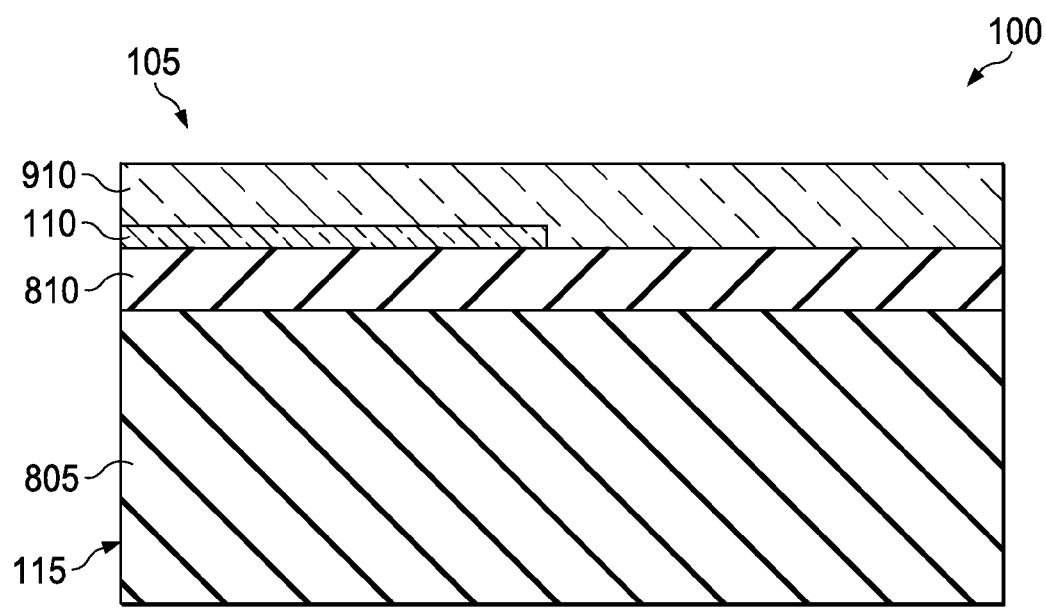

FIGS. 9A and 9B show the device 100 after patterning the substrate 115 to form a waveguide 110, e.g., as part of step 705 (FIG. 7A) or step 735 (FIG. 7B). In some cases, the lower layer 810 of silicon oxide acts as a cladding layer for the waveguide 110 (e.g., composed of silicon). FIGS. 9A and 9B also shows the device 100 after covering the waveguide 110 with an upper layer 910 also as part of step 710 or step 735. For instance, an upper layer 910, e.g., composed of a second type of glass, can be blanket-deposited over the entire substrate 115 via physical or vapor deposition processes. In some cases, the upper layer 910 of glass acts as a cladding layer for the waveguide 110.

Figure 10A:
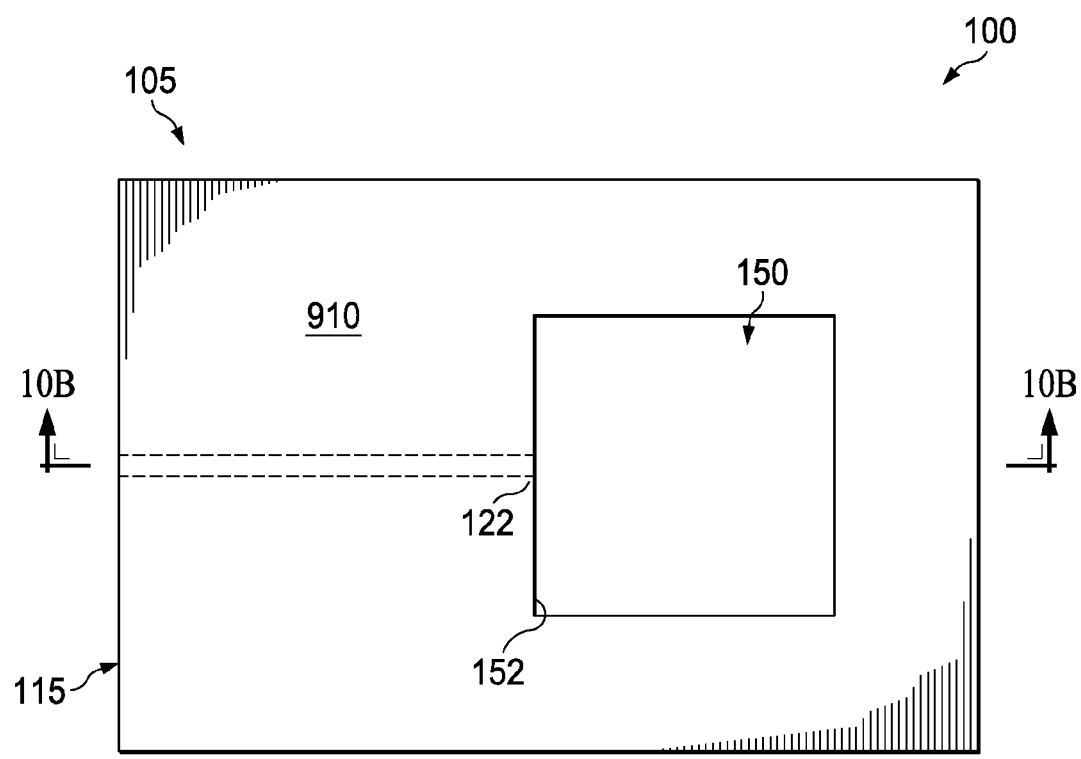
Figure 10B:
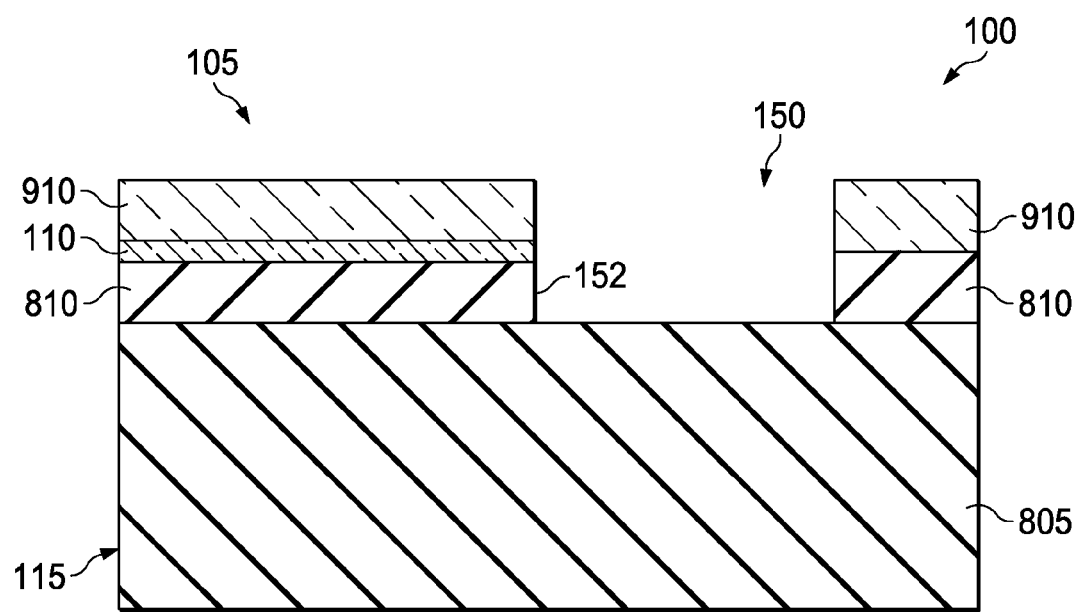

FIGS. 10A and 10B show the device 100 after patterning the substrate 115 to form a cavity 150, e.g., as part of step 715 (FIG. 7A) or step 740 (FIG. 7B). In some cases, it is desirable to form the cavity 150 in step 740 after forming the waveguide 110, because this facilitates forming the cavity such that the end 122 of the waveguide 110 terminates at an interior wall 152 of the cavity 150. In some cases, as shown in FIGS. 10A and 10B, only the upper and lower layers 810, 910 are patterned as forming the cavity 150. In other cases, however, the base substrate layer 805 could also be patterned. As further illustrated, the patterning step (e.g., step 710 or step 740) can further include forming an alignment feature (e.g., analogous to one or more corresponding features 315, 335, 337, 340, 410 of FIGS. 1A-4B) in accordance with step 755.

Figure 11A:
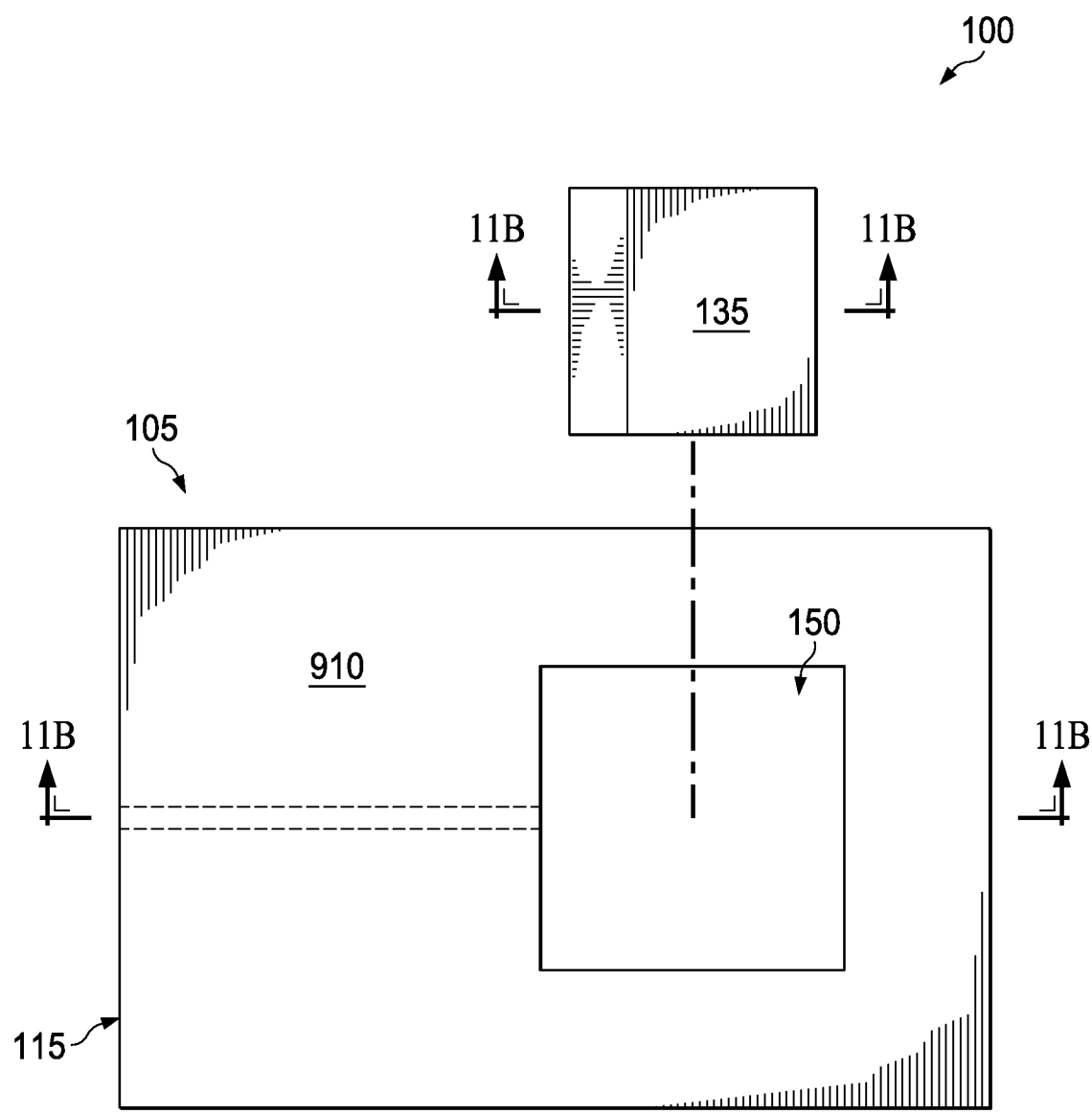
Figure 11B:
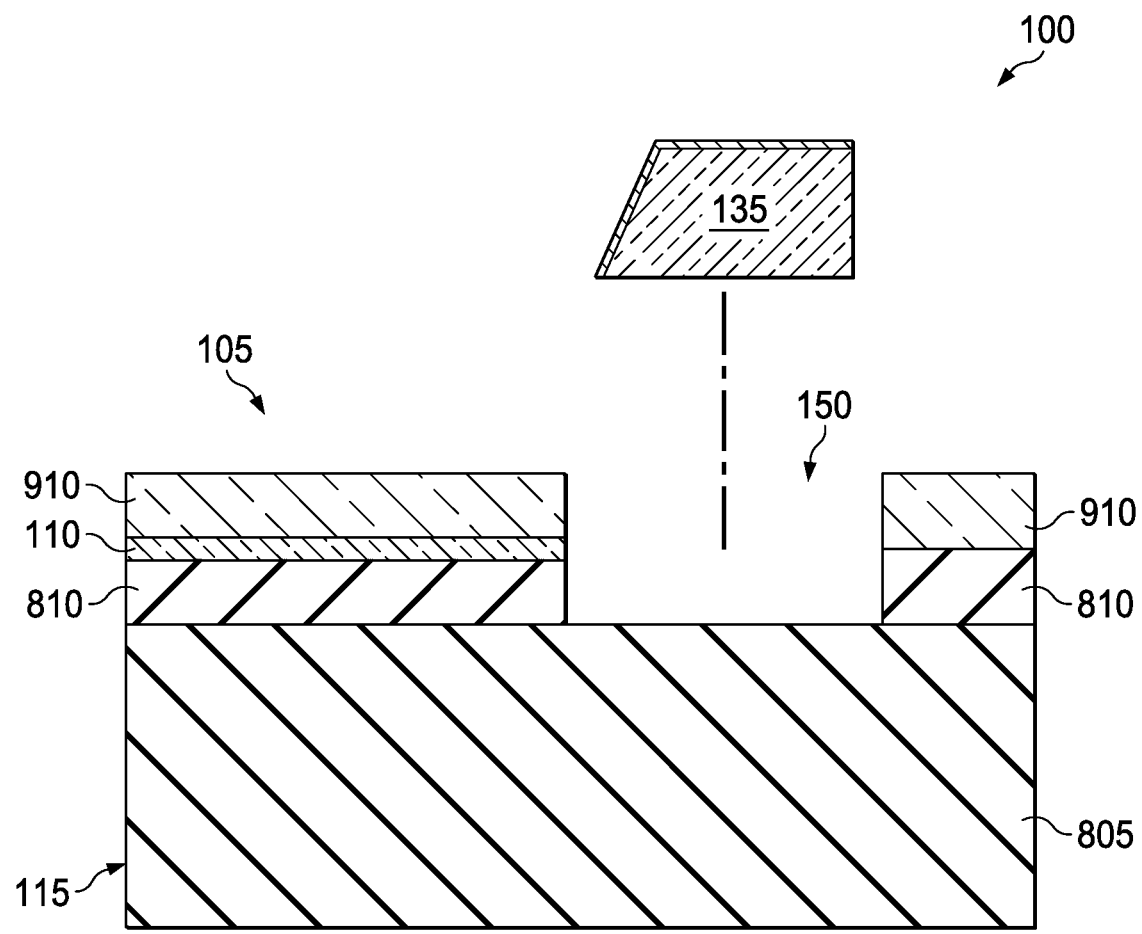

FIGS. 11A and 11B show the device 100 after providing a turning mirror 135, e.g., as part of step 745.

Figure 12A:
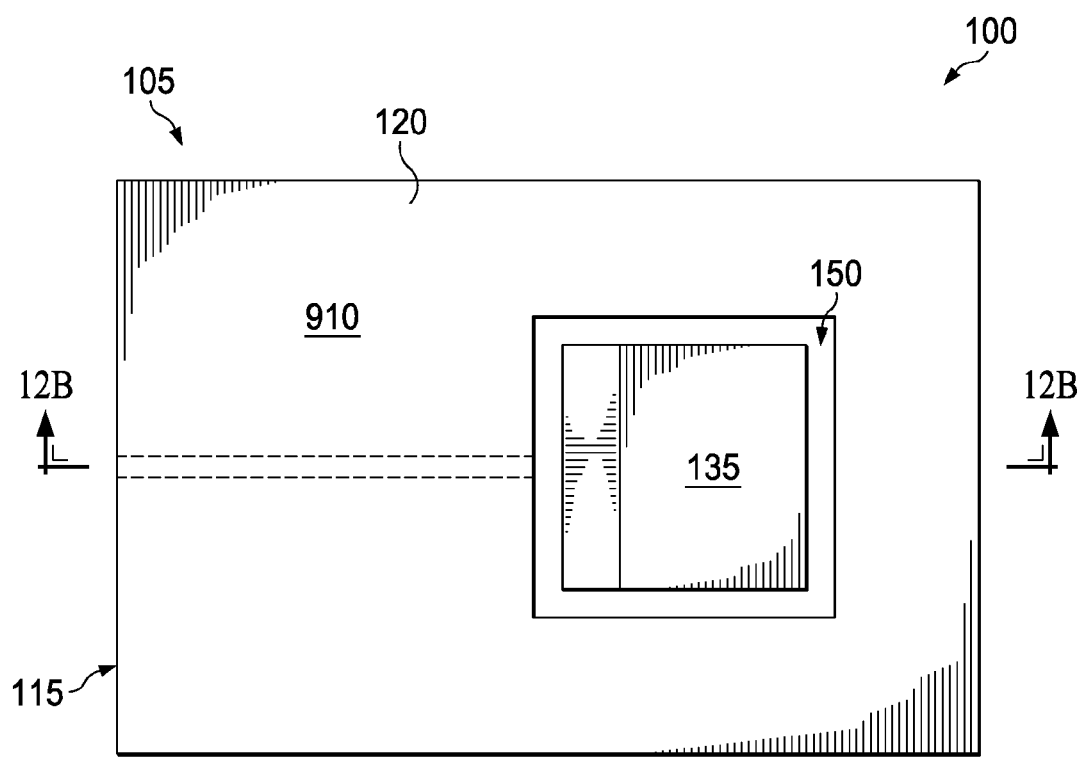
Figure 12B:
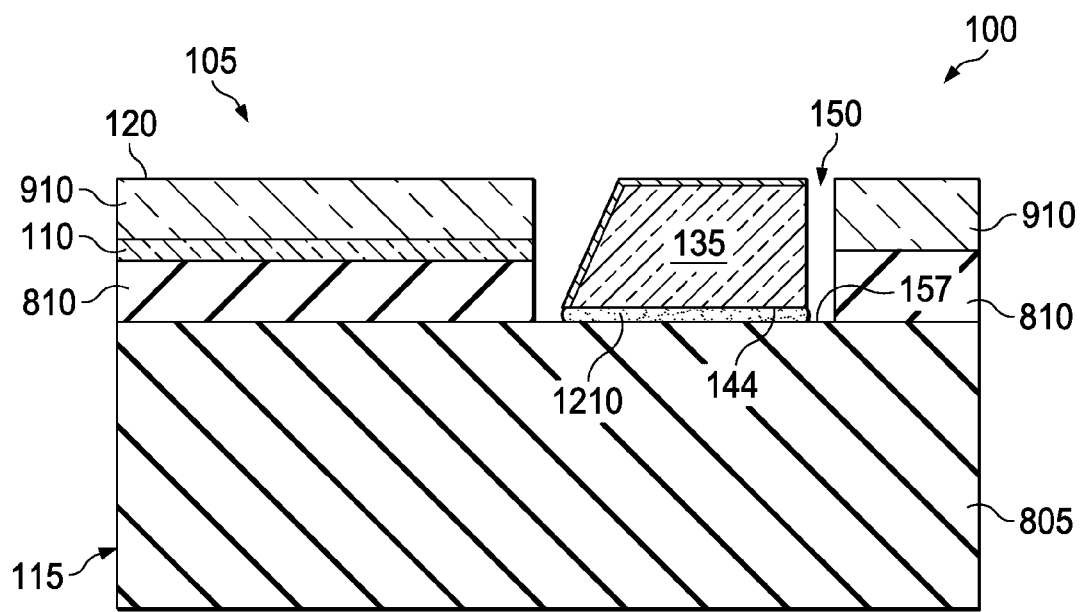

FIGS. 12A and 12B shows the device 100 after mounting the turning mirror 135 in the cavity 150, in accordance with step 750 (FIG. 7B). In some cases, as shown in FIG. 12B, mounting the turning mirror 135 includes bonding the turning mirror 135 (e.g., the bottom surface 144) to the substrate's 115 mounting surface 120 (e.g., the base 157 of the cavity 150) using an adhesive 1210, such as an adhesive designed specifically for chip bonding in microelectronic and optoelectronic applications. Examples include conductive epoxy adhesives such as Epotek H20E (Epoxy Technology, Inc., Billerica, Mass.).

In some cases, the turning mirror 135 is bound to the substrate surface 120 in accordance with step 710 (FIG. 7A) in the absence of a cavity 150. One skilled in the art would be familiar with suitable mounting techniques, such as the use of robotically-controlled micro-manipulators to mount the turning mirror 135, or a portion thereof, in the cavity 150 (e.g., FIGS. 1C-1D) or bound the turning mirror 135 to the surface 120 which does not have a cavity (e.g., FIGS. 1A-1B).

FIGS. 13A-16B show selected steps in an example process of providing a turning mirror 135 in accordance with step 745.

Figure 13A:
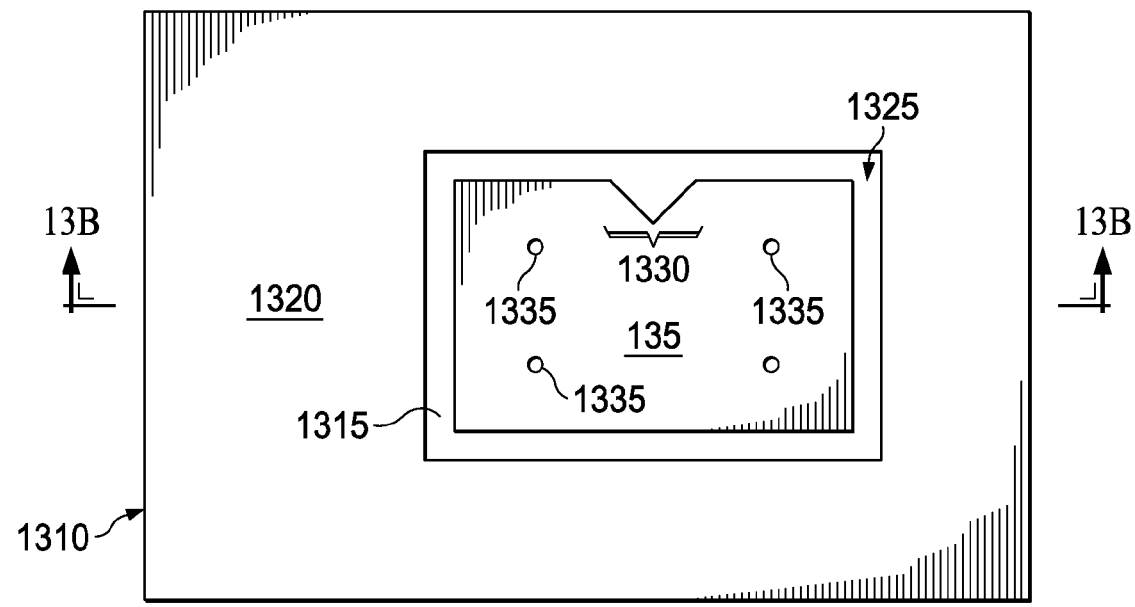
Figure 13B:
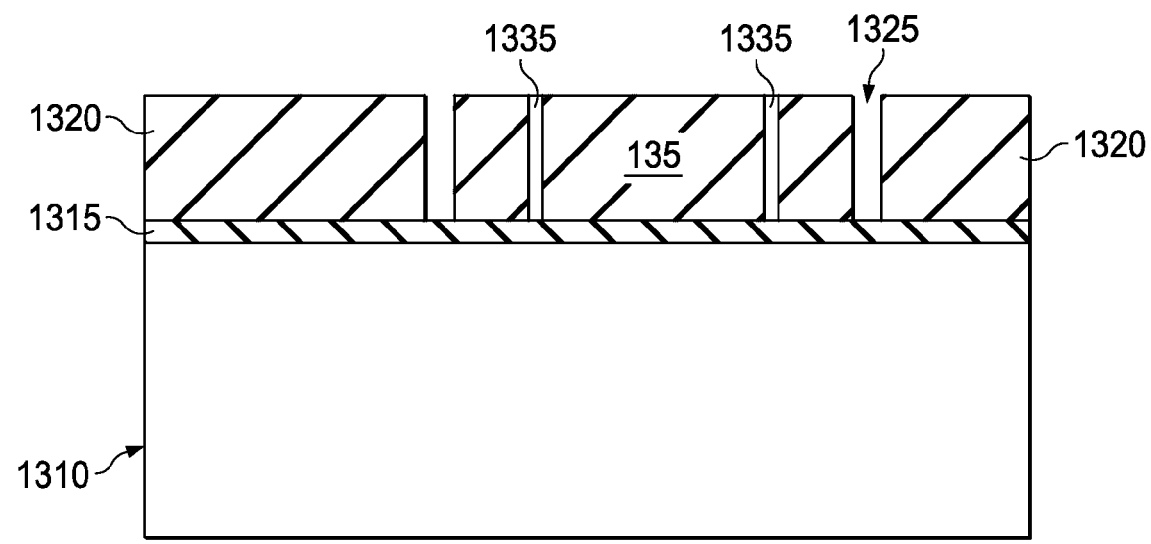

FIGS. 13A and 13B show a second substrate 1310 from which the turning mirror 135 can be fabricated from. In some case the second substrate 1310 is a silicon-on-insulator substrate, having an underlying material layer 1315 of silicon oxide and upper material layer 1320 of silicon.

FIGS. 13A and 13B also show the second substrate 1310 after patterning (e.g., step 720, FIG. 7A; step 760, FIG. 7B) as part of forming the turning mirror 135. For instance, standard photolithography and etching (e.g., reactive ion etching) processes can be used to form trenches 1325 in the material layer 1320 (e.g., the silicon layer), using the underlying layer 1315 (e.g., a silicon oxide layer) as an etch stop layer. As further illustrated, in some embodiments, the pattern step 760 can further include forming alignment feature 1330 and release holes 1335 in the second substrate 1310, in accordance with steps 765 and 767, respectively.

Figure 14A:
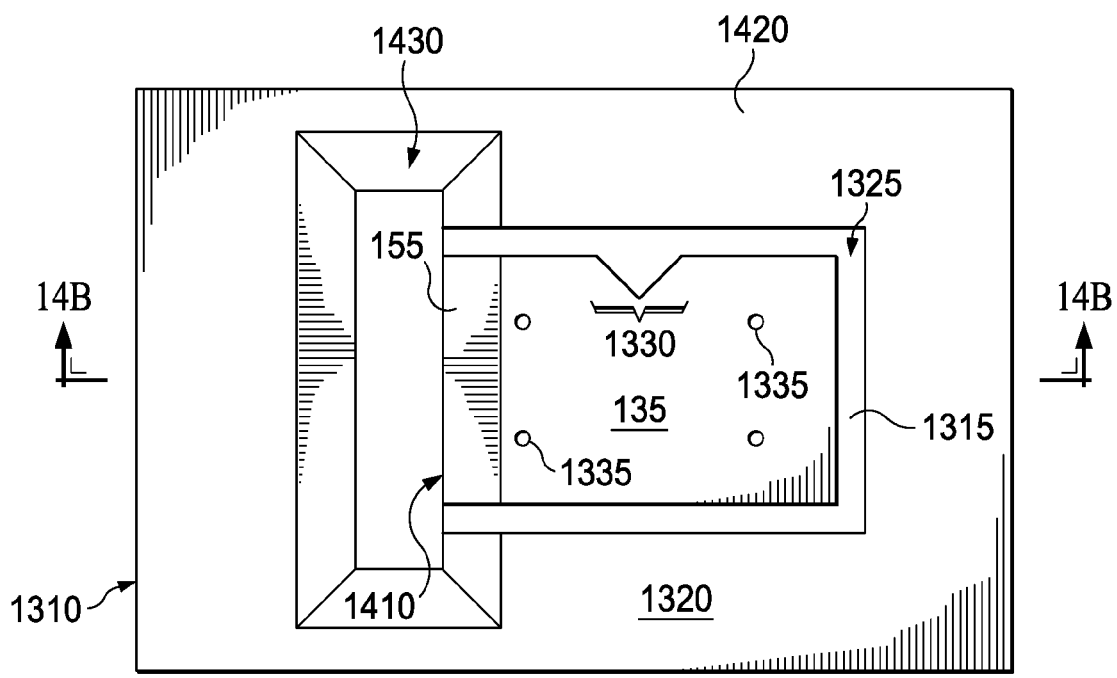
Figure 14B:
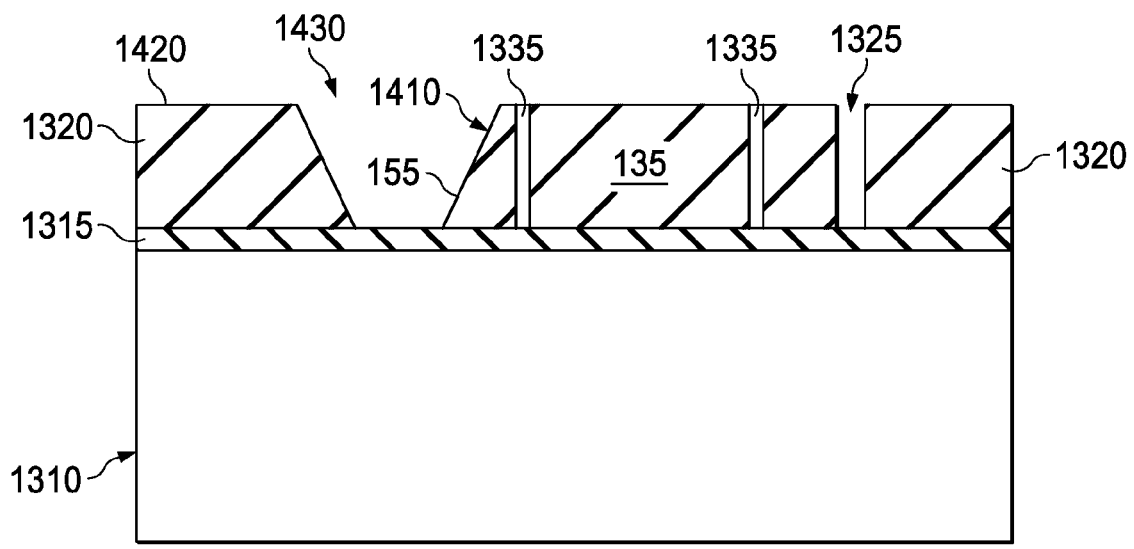

FIGS. 14A and 14B show the second substrate 1310 after being etched to form a slanting reflecting surface 1410 (e.g., slanting relative to a planar surface 1420), in accordance with step 710 (FIG. 7A) or step 770 (FIG. 7B). For instance, at least one sidewall 155 of the turning mirror 135 can be etch to form a slanted surface 1410 relative to a planar surface 1420 which can include a non-etched top surface of the material layer 1320 of the second substrate 1310. For instance, in some cases, when the material layer 1320 is a crystalline layer (e.g., a (100) silicon layer), a portion of the material layer 1320 can be etched to form a slanted second trench 1430 along the sidewall 155, using an anisotropic etch, such as a wet potassium hydroxide (KOH) etch.

Figure 15A:
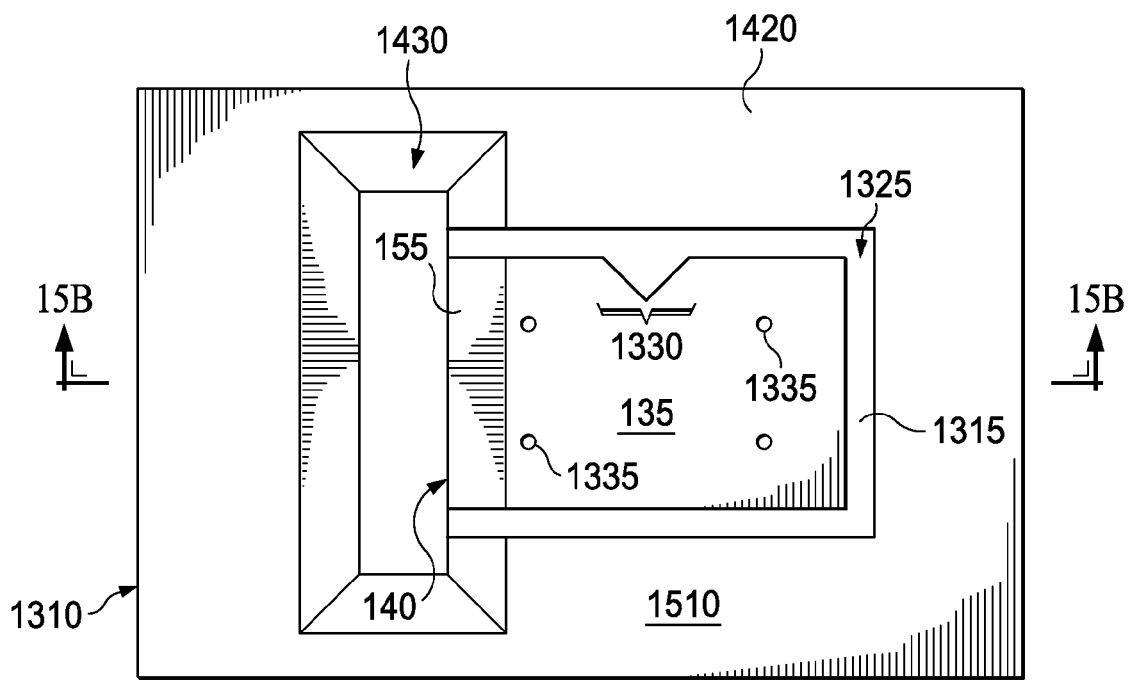
Figure 15B:
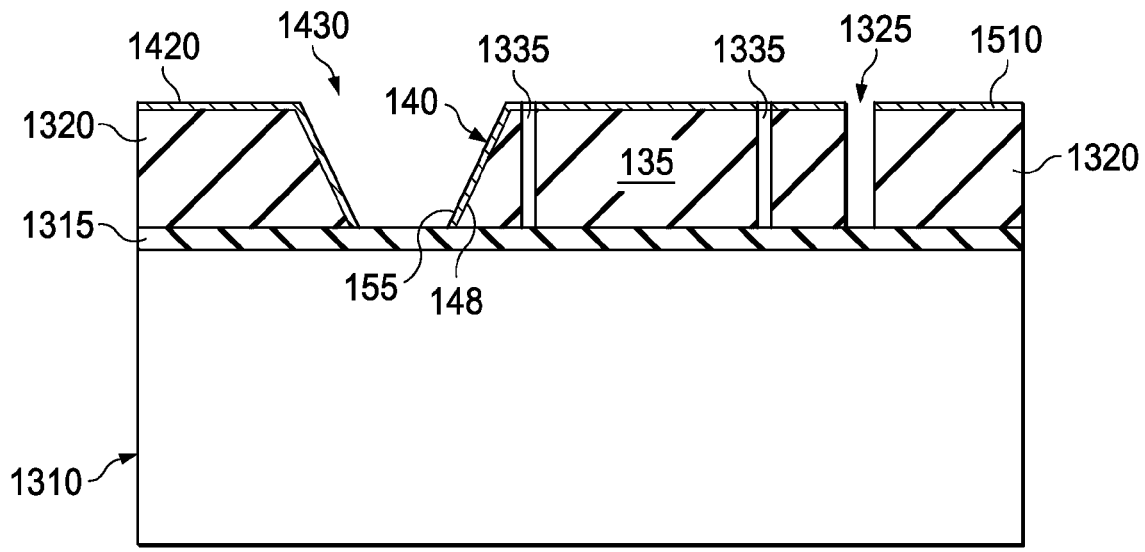

FIGS. 15A and 15B show the second substrate 1310 after coating the slanted surface 1410 (FIG. 1410) of the turning mirror 135 with a reflective layer 1510, e.g., in accordance with step 775 (FIG. 7B) as part of forming the reflecting surface 140. For instance, in some cases, a reflective layer 1510 of metal such as gold can be deposited via a metal evaporation process. In other cases, such as when the material layer 1320 is made of a reflective material (e.g., a metal such as gold, silver, aluminum, or metal alloys) there may be no need to coat the slanted surface 1410 with the reflective layer 1510.

Figure 16A:
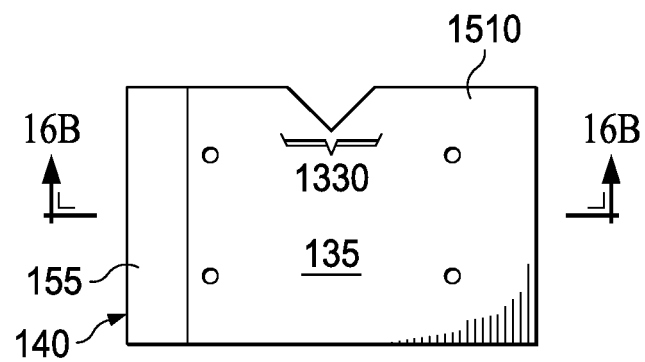
Figure 16B:
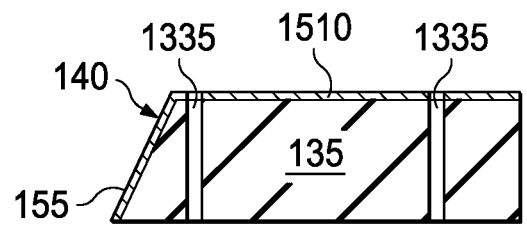

FIGS. 16A and 16B shows the turning mirror 135 after being released from the second substrate 1310 (FIGS. 15A and 15B) in accordance with step 780. For instance, referring to FIGS. 15A and 15B, when the underlying layer 1330 comprises silicon oxide, the turning mirror 135 can be released by introducing an etchant such as hydrofluoric acid through the trenches 1315, 1430 (FIGS. 15A and 15B) and release holes 1330 to thereby dissolve portions of the underlying layer 1330 that hold the turning mirror 135 to the substrate 1310.

In some cases, as part of step 780, the turning mirror 135 is partially released from the second substrate 1310 prior to coating the slanted surface 1410 as described above. For instance, the turning mirror 135 can be tethered to the second substrate 1310 but otherwise released from the underlying layer 1315 of the second substrate 1310 (FIG. 13B). Then, after coating the slanted surface 1410, the turning mirror 135 can be fully released by breaking the tethers. In some cases, the process of breaking the tethers can leave tethering remnants on the turning mirror 135, which in turn, can be used as alignment features (e.g., tethering remnants 340 FIG. 3C).

One skilled in the art would be familiar with other steps that could be performed to form other components of the optical device, including forming or providing photo detectors, light-source, such as a laser light-source, to complete the optical device, e.g., to be, or to include a PIC 105.

Although the embodiments have been described in detail, those of ordinary skill in the art should understand that they could make various changes, substitutions and alterations herein without departing from the scope of the disclosure.

The invention claimed is:
1. An optical device, comprising:
a substrate having a surface;
an optical waveguide located near, and parallel to, said substrate surface and having an end located and oriented to emit or receive light propagating substantially parallel to said substrate surface; and a crystalline turning mirror bound at a mounting interface of said substrate surface, said crystalline turning mirror having a bottom surface along the substrate surface and having a reflecting surface that is slanted relative to substrate said surface, and wherein said light is directed from a light-source located above said substrate surface towards said reflecting surface, or, said light is reflected off said reflecting surface in a direction that is non-parallel to and above said substrate surface.

2. The device of claim 1, wherein said substrate, said waveguide and said crystalline turning mirror are components of a photonic integrated circuit.

3. The device of claim 2, wherein said photonic integrated circuit includes an array of said waveguides and said crystalline turning mirrors on said substrate surface.

4. The device of claim 1, wherein said continuous planar reflecting surface is covered by a metal layer.

5. The device of claim 1, wherein said crystalline turning mirror and said substrate are composed of a same material.

6. The device of claim 5, wherein said same material includes silicon.

7. The device of claim 1, wherein said crystalline turning mirror and said substrate are formed of different crystalline alloys.

8. The device of claim 1, wherein said continuous planar reflecting surface is separated from said end of said optical waveguide by a distance of about 20 micrometers or less.

9. The device of claim 1, wherein at least a portion of said crystalline turning mirror is part of a cavity of an optical resonator located on said substrate surface.

10. The device of claim 1, wherein said crystalline turning mirror and said substrate are composed of different materials.

11. A method of using an optical device, comprising:
transmitting light to an optical waveguide located near, and parallel to, a surface of a substrate such that said light propagates substantially parallel to said substrate surface;

emitting said transmitted light from an end of said waveguide, said end located and oriented to emit or receive said light;

reflecting said emitted light off of a continuous reflecting surface of a crystalline turning mirror bound along a bottom surface thereof to said substrate surface, said continuous reflecting surface being slanted relative to said substrate surface and oriented to direct said light into or out of said end of said waveguide, and directing said light from a light-source located above said substrate surface towards said continuous reflecting surface.

12. A method of using an optical device, comprising:
transmitting light to an optical waveguide located near, and parallel to, a surface of a substrate such that said light propagates substantially parallel to said substrate surface;

emitting said transmitted light from an end of said waveguide, said end located and oriented to emit or receive said light; and reflecting said emitted light off of a continuous reflecting surface of a crystalline turning mirror bound along a bottom surface thereof to said substrate surface, said continuous reflecting surface being slanted relative to said substrate surface and oriented to direct said light into or out of said end of said waveguide, wherein said light emitted from said end of said waveguide is reflected off said continuous reflecting surface in a direction that is non-parallel to and above said substrate surface.

13. The method of claim 11, wherein said light reflected off of said continuous reflecting surface is in a direction that is parallel to said substrate surface and into said end of said waveguide.

* * * * *